(12) United States Patent
Hendricks

(10) Patent No.: US 9,480,206 B2
(45) Date of Patent: Nov. 1, 2016

(54) DECORATION HANGER

(71) Applicant: Jared Hendricks, Draper, UT (US)

(72) Inventor: Jared Hendricks, Draper, UT (US)

(73) Assignee: Shining Sea Trading Company, West Valley City, UT (US)

( * ) Notice: Subject to any disclaimer, the term of this patent is extended or adjusted under 35 U.S.C. 154(b) by 0 days.

(21) Appl. No.: 14/270,284

(22) Filed: May 5, 2014

(65) Prior Publication Data

US 2015/0001362 A1    Jan. 1, 2015

Related U.S. Application Data

(63) Continuation of application No. 12/860,730, filed on Aug. 20, 2010, now Pat. No. 8,777,023, which is a continuation-in-part of application No. 12/333,434, filed on Dec. 12, 2008, now abandoned.

(60) Provisional application No. 61/235,533, filed on Aug. 20, 2009.

(51) Int. Cl.
*A47F 5/00* (2006.01)
*A01G 5/04* (2006.01)
*A47H 1/12* (2006.01)
(Continued)

(52) U.S. Cl.
CPC .................. *A01G 5/04* (2013.01); *A47G 35/00* (2013.01); *A47H 1/12* (2013.01); *A47H 1/142* (2013.01); *E06B 7/28* (2013.01); *A47G 25/0692* (2013.01); *A47H 1/022* (2013.01); *A47H 2023/003* (2013.01); *Y10T 292/23* (2015.04)

(58) Field of Classification Search
CPC .......... A01G 5/04; A47H 1/12; A47H 1/142; A47H 2023/003; A47H 1/022; E06B 7/28; A47G 35/00; A47G 25/0692; Y10T 292/23

USPC ........ 211/13.1, 87.01, 96, 104, 105.1, 105.3, 211/106.01, 119.004; 248/309.1, 200.1, 248/214, 215, 251, 254, 256–260, 262–265, 248/267–272, 303, 304; 160/350, 349.2
See application file for complete search history.

(56) References Cited

U.S. PATENT DOCUMENTS

D29,334 S     9/1898  Canedy
645,543 A  *  3/1900  Birch ......................... 211/105.6
(Continued)

FOREIGN PATENT DOCUMENTS

FR          2490924 A1    4/1982

*Primary Examiner* — Joshua J Michener
*Assistant Examiner* — Devin Barnett
(74) *Attorney, Agent, or Firm* — Thorpe North & Western, LLP

(57) ABSTRACT

A hanger for hanging of garlands and the like around a doorway can be removably placed within a doorway, where it is secured by pressure and friction, thereby avoiding any damage to the door or door frame. The hanger includes outward extensions that extend outward of the door frame to permit hanging of garlands and the like on either side of the doorway. The hanger may also include one or more central extensions for supporting the garlands or the like centrally above the doorway so that the garland or the like does not hang downward too much, thus keeping the doorway clear. The hanger can also be a part of the decoration around the doorway. Various configurations of the hanger may fit different widths of door frames, including a wide range of door frame widths, and features of the hanger provide additional flexibility for different door configurations including sidelights.

12 Claims, 22 Drawing Sheets

(51) Int. Cl.
*A47H 1/142* (2006.01)
*E06B 7/28* (2006.01)
*A47G 35/00* (2006.01)
*A47H 1/022* (2006.01)
*A47G 25/06* (2006.01)
*A47H 23/00* (2006.01)

(56) References Cited

U.S. PATENT DOCUMENTS

| | | | |
|---|---|---|---|
| 730,304 A * | 6/1903 | Searles | 248/258 |
| 734,129 A * | 7/1903 | Labelle | 248/259 |
| 1,017,574 A * | 2/1912 | Marquis | 248/260 |
| 1,077,529 A | 11/1913 | Griffin | |
| 1,180,143 A | 4/1916 | Hall | |
| 1,194,842 A * | 8/1916 | Hunter | 248/258 |
| 1,270,634 A | 6/1918 | Lowe | |
| 1,375,805 A * | 4/1921 | Umphrey | 211/105.2 |
| 1,386,715 A | 8/1921 | Lewin | |
| 1,435,613 A | 11/1922 | Miller | |
| 1,480,065 A | 1/1924 | Hart et al. | |
| 1,564,328 A * | 12/1925 | Cutting | 160/112 |
| 1,662,492 A | 3/1928 | Diescher et al. | |
| 1,666,408 A | 4/1928 | Dalton | |
| 1,697,763 A | 1/1929 | Hall | |
| 1,756,716 A * | 4/1930 | Whitney | 211/123 |
| 1,799,558 A | 4/1931 | Howard | |
| 1,799,611 A * | 4/1931 | Avery | 248/213.3 |
| 1,800,030 A | 4/1931 | Reynolds | |
| 1,819,965 A * | 8/1931 | Norling | 160/92 |
| 1,909,334 A | 5/1933 | Brewer | |
| 2,012,482 A * | 8/1935 | Nace | 248/254 |
| 2,046,824 A | 7/1936 | Kenney | |
| 2,139,502 A * | 12/1938 | Jamgochian | 24/1 |
| 2,236,017 A * | 3/1941 | Stratton | A47H 1/022 160/123 |
| 2,275,236 A | 3/1942 | Shannon | |
| 2,380,487 A * | 7/1945 | Ackley | 269/297 |
| 2,382,003 A | 8/1945 | Cones | |
| 2,405,354 A * | 8/1946 | Hansen et al. | 160/349.2 |
| 2,452,680 A * | 11/1948 | Ratcliffe | 248/254 |
| 2,474,434 A | 6/1949 | Mentz | |
| 2,479,778 A * | 8/1949 | Pufahl | A47H 1/08 16/87.2 |
| 2,532,909 A | 12/1950 | Hart | |
| 2,583,613 A | 1/1952 | Talbot | |
| 2,617,537 A | 11/1952 | Henley | |
| 2,758,724 A | 8/1956 | Schneider | |
| 2,903,141 A | 9/1959 | Seewack | |
| 2,973,870 A | 3/1961 | Schoos | |
| 2,974,806 A | 3/1961 | Seewack | |
| 3,040,902 A | 6/1962 | Dunn | |
| 3,083,494 A | 4/1963 | Lindenbaum | |
| 3,951,269 A | 4/1976 | Anderson | |
| 4,077,072 A | 3/1978 | Dezura | |
| 4,125,078 A * | 11/1978 | Nyquist | 108/29 |
| 4,378,071 A * | 3/1983 | Yakimicki | 211/105.4 |
| 4,458,894 A * | 7/1984 | Dudley | 482/40 |
| 4,529,191 A * | 7/1985 | Miller et al. | 482/40 |
| 4,633,612 A * | 1/1987 | Forkish | 49/55 |
| 4,754,504 A | 7/1988 | Cellini | |
| 5,018,626 A * | 5/1991 | Johnson | 211/105.1 |
| 5,018,918 A * | 5/1991 | Jacobs et al. | 410/145 |
| 5,295,527 A * | 3/1994 | West | 160/199 |
| 5,345,623 A | 9/1994 | Dearman | |
| 5,553,823 A * | 9/1996 | Protz, Jr. | 248/304 |
| 5,678,703 A * | 10/1997 | Sawyer | 211/105.1 |
| 5,810,302 A * | 9/1998 | McCance | 248/200.1 |
| 5,848,628 A | 12/1998 | Badalamenti | |
| D415,014 S | 10/1999 | Bruton | |
| 6,016,926 A | 1/2000 | Smith et al. | |
| 6,125,590 A * | 10/2000 | Dionne | 49/453 |
| 6,179,748 B1 * | 1/2001 | Barr | 482/40 |
| 6,233,877 B1 * | 5/2001 | Monroe | 52/37 |
| 6,311,851 B1 * | 11/2001 | Knudsen et al. | 211/13.1 |
| 6,499,186 B1 * | 12/2002 | Arentsen | 16/87 R |
| 6,508,743 B1 * | 1/2003 | Fortin | 482/41 |
| 6,516,957 B1 * | 2/2003 | Harkinson | 211/105.1 |
| 6,575,416 B1 * | 6/2003 | Avinger | 248/307 |
| D483,251 S | 12/2003 | Suero, Jr. | |
| 6,694,543 B2 * | 2/2004 | Moore | 4/610 |
| 6,851,652 B1 * | 2/2005 | Huang | 248/200.1 |
| 6,857,608 B2 * | 2/2005 | Avinger | 248/215 |
| 7,239,906 B1 * | 7/2007 | Green et al. | 600/407 |
| 7,621,847 B2 * | 11/2009 | Lamle et al. | 482/40 |
| 7,987,534 B2 * | 8/2011 | Lin | 4/608 |
| 8,132,366 B1 * | 3/2012 | LeBlanc | 47/67 |
| 8,777,023 B2 | 7/2014 | Hendricks et al. | |
| 2005/0017144 A1 * | 1/2005 | Jackson et al. | 248/309.1 |
| 2007/0090246 A1 * | 4/2007 | Carvalho et al. | 248/264 |
| 2007/0187347 A1 | 8/2007 | McCreary | |
| 2009/0101609 A1 * | 4/2009 | Batshon | 211/105.3 |
| 2010/0147788 A1 | 6/2010 | Hendricks | |
| 2011/0024376 A1 | 2/2011 | Hendricks et al. | |
| 2013/0198948 A1 * | 8/2013 | Zeng | A47K 3/38 4/610 |
| 2016/0073813 A1 * | 3/2016 | Cheng | A47H 1/022 248/262 |

* cited by examiner

DECORATION HANGER

CROSS-REFERENCE TO RELATED APPLICATIONS

This application is a continuation of U.S. patent application Ser. No. 12/860,730, filed Aug. 20, 2010, which is a continuation-in-part of prior U.S. patent application Ser. No. 12/333,434, filed Dec. 12, 2008, which claims the benefit of U.S. Provisional Patent Application No. 61/235,533, filed Aug. 20, 2009, each of which are incorporated herein by reference for all they disclose.

BACKGROUND OF THE INVENTION

1. Field of the Invention

The present invention relates to devices for decorating around a door, and more particularly to an innovative hanger for temporarily hanging decorations such as garlands around a door without causing damage to the door or door frame.

2. Background and Related Art

Existing methods and mechanisms for hanging decorations such as garlands on or around doors exhibit significant problems. Some hangers require screws, nails, or other fasteners to be used to attach the hangers to the door frame. When a decorating season is over, the hangers are typically removed, leaving unsightly holes in the door frame, which can also serve as locations for insects to live and/or cause additional damage. Other methods of hanging rely on adhesives such as tape to secure decorations around the door. Such methods are often unsightly while the decorations are displayed, and may leave an adhesive residue behind that further mars the appearance of the door or door frame after the decorative season.

Some existing decorative hangers rely on an over-the-door system, where a portion of the hanger extends over the top of the door. Such hangers have several problems. For instance, some decorations are difficult to use when attached to the door, as they then move with the door as the door is opened and shut, and can become trapped between the door and frame as the door is shut or are generally in the way of someone trying to pass through the doorway. Additionally, such hangers have a non-negligible thickness which is trapped between the door and the door frame when the door is closed. The space between the door and the door frame is often occupied by weather stripping or other material to prevent air leaks, insect entry, etc. when the door is closed. The presence of the door hanger in this space may make the door difficult to close, may cause the weather stripping to fail to perform as expected, and may even, permanently damage the weather stripping, the door, or the door frame. Some doors simply cannot accept such hangers.

Other door-frame mounting devices fail to properly position garlands and the like around the door frame without partially occupying or blocking the doorway for those using the doorway. Still other devices require a mounting that would, prevent a door from closing. While such devices work well in doorless doorways, they do not work well on an exterior doorway where the door is typically left in a closed position for safety reasons. Therefore, existing devices for hanging garlands and the like around doors fail to adequately provide a mechanism for hanging garlands and other decorations around a doorway without causing damage to the door or door frame.

BRIEF SUMMARY OF THE INVENTION

Implementation of the invention provides a hanger for hanging of garlands and the like around a doorway. The hanger can be removably placed within a doorway, where it is secured by pressure and friction, thereby avoiding any damage to the door or door frame. The hanger includes outward extensions that extend outward of the door frame to permit hanging of garlands and the like on either side of the doorway. The hanger may also include one or more central supports or extensions for supporting the garlands or the like centrally above the doorway so that the garland or the like does not hang downward too much, thus keeping the doorway clear.

Implementation of the invention may be provided using a large number of materials and decorative forms, whereby the garland hanger can also be a part of the decoration around the doorway. Additionally, implementations of the invention may be provided to fit different widths of door frames, and some implementations may be provided capable of fitting a wide range of door frame widths. The garland hanger is provided with features that prevent slipping of the garland hanger and/or downward rotation of the garland hanger that would negatively impact the look and functionality of the garland hanger.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide a hanger for hanging of garlands and the like around a doorway. The hanger can be removably placed within a doorway, where it is secured by pressure and friction, thereby avoiding any damage to the door or door frame. The hanger includes outward extensions that extend outward of the door frame to permit hanging of garlands and the like on either side of the doorway. The hanger may also include one or more central supports or extensions for supporting the garlands or the like centrally above the doorway so that the garland or the like does not hang downward too much, thus keeping the doorway clear. While the term "garland hanger" is used herein to refer to embodiments of the invention, it will be understood that a wide range of decorations or other items may be hung from the garland hanger, including garlands, Christmas lights. Halloween decorations such as spider webs, decorative banners, floral arrangements and other plant-based, hanging decorations, etc.

Embodiments of the Invention may be provided using a large number of materials and decorative forms, including rod/wrought iron and similar looks, whereby the garland hanger can also be a part of the decoration, around the doorway. Additionally, embodiments of the invention may be provided to fit different widths of door frames, and some embodiments may be provided capable of fitting a wide range of door frame widths. The garland hanger is provided with features that prevent slipping of the garland hanger and/or downward rotation of the garland hanger that would negatively impact the look and functionality of the garland hanger. These features of embodiments of the invention will become clearer with reference to the appended Figures, which are incorporated into this description for all they disclose.

Figure 1:
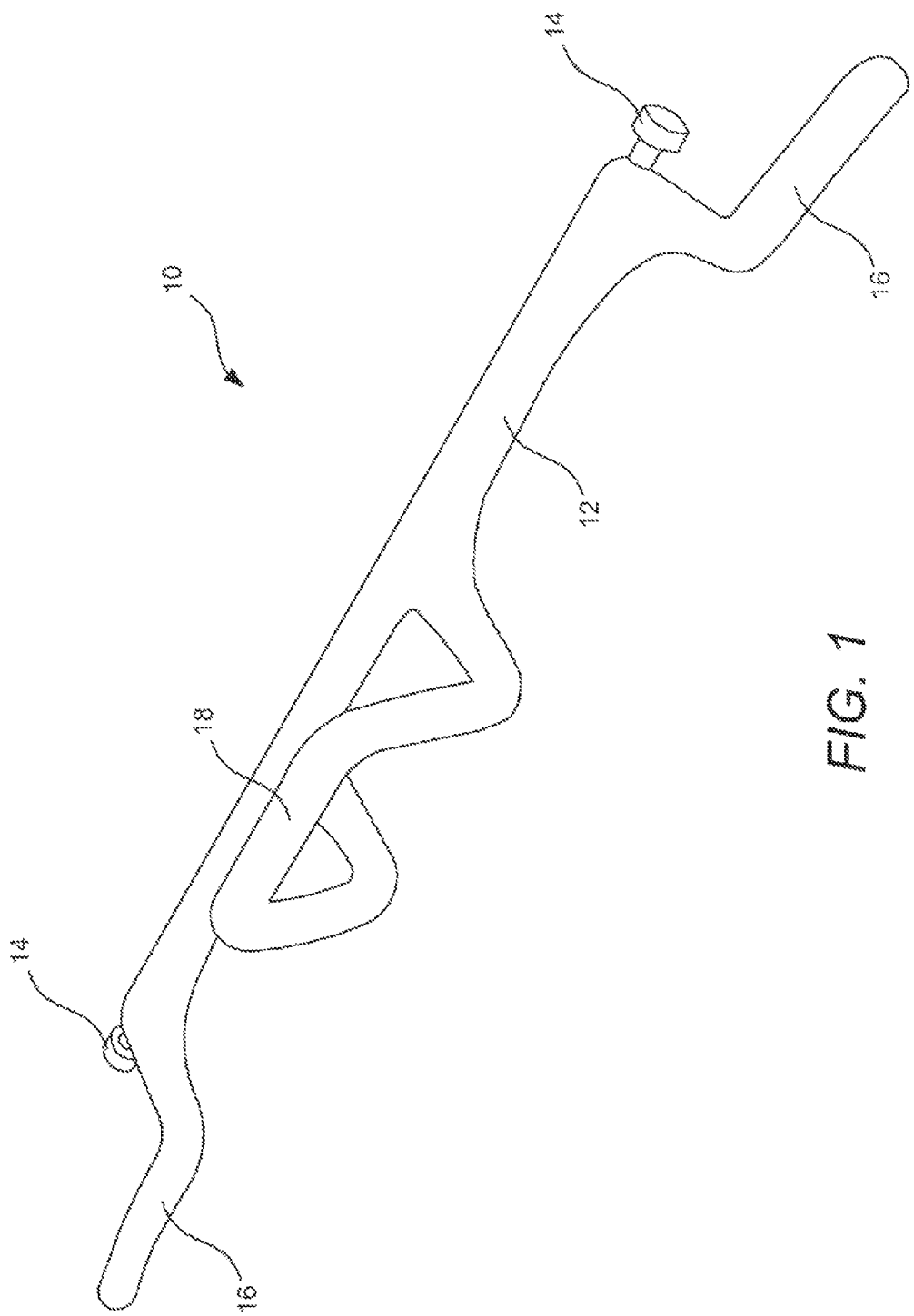
FIG. 1 shows a perspective view of a conceptualization of an embodiment of the invention.

FIG. 1 shows a perspective view of an embodiment of the invention that illustrates certain features of embodiments of the invention. FIG. 1 shows an illustrative garland hanger 10. The garland hanger 10 includes a central support member 12 configured to extend between the sides of a door frame. At each end of the central support member 12 is a frictional member 14 that is configured to exert an outwardly-directed force and to frictionally engage an inwardly-directed surface of the door frame so as to hold the garland hanger 10 in place against the forces of gravity pulling downward on the garland hanger 10 and on any decorations hanging on the garland hanger 10. Therefore, the frictional members 14 are attached to the central support member 12 in such a way as to permit secure frictional engagement between the frictional members 14 and the door jambs. For example, the frictional members 14 may be movable within some range and may be biased or include a compressible or flexible element that permits compression of the frictional members 14 or some component thereof while the garland hanger 10 is placed, whereupon the compression/flexion may be released to hold the garland hanger 10 in place. Alternatively, the garland hanger 10 may be placed in a desired location and an adjustment mechanism actuated to expand the distance between outer-surfaces of the respective frictional members 14 until the garland hanger 10 is secured in place.

The frictional mechanism for securing the garland hanger 10 is advantageous in that it causes no damage to the door or door frame/jambs, and can easily be removed and reused at will. To further prevent damage, the portions of the frictional mechanism that contact the door frame may be made of or covered with a non-damaging frictional material such as any such material now known in the art or later invented. No holes are ever made in the door, the door jambs, or any surrounding structure.

The garland hanger 10 also includes structures to facilitate hanging of garland or other decorations around the door frame. For example, the illustrated embodiment includes two lateral extension members 16 that extend from the central support member 12 so as to extend beyond the inner edges of the door frame/jambs. The lateral, extension members 16 also extend forward from the central support member 12 so as not to be co-linear with the central support member 12 or at least so as not to be co-linear with door-frame-contacting portions of the frictional members 14. This configuration permits the lateral extension members 16 to be used to support garland or other decorations on either side of the doorway.

The lateral extension members 16 may also serve an additional purpose: they may prevent unwanted rotation about the axis of the central support member 12 or the axis of the frictional members 14. For example, when the garland hanger 10 is placed in a doorway, the lateral, support members 16 may be placed so as to be immediately adjacent to or touching the face of the door jambs/frame. Then, when any downward force is applied to the lateral extension members 16 (such as by gravity or some other force pulling downward on any hung decorations), the force would tend to rotate the garland hanger 10 downward about the axis of the line between the fractional members 14 (and, if co-linear, the central support member 12). However, as the garland hanger 10 starts to rotate downward, the lateral extension members 16 engage the edges of the door jambs/frame, thereby preventing the rotation (or, at least, any further rotation beyond a certain point).

The illustrated garland hanger 10 also includes a central decorative support 18. This central decorative support 18 is optional in some embodiments, and other embodiments may include multiple spaced-apart central decorative supports 18, depending on the desired appearance of the garland hanger 10 and/or the desired decoration-supporting characteristics of the garland hanger 10. If present, the central decorative support 18 provides an additional supporting location for supporting garlands or other decorations, such as for decorations that extend up along one side of the doorway to the lateral extension member 16 on that side, over the top of the doorway via the central decorative support(s) 18 to the opposite lateral extension member 16 and down the opposite side of the doorway. The central decorative support 18 may take any of a varied number of shapes, and in some configurations may serve as a handle for carrying the garland hanger 10.

Figure 2:
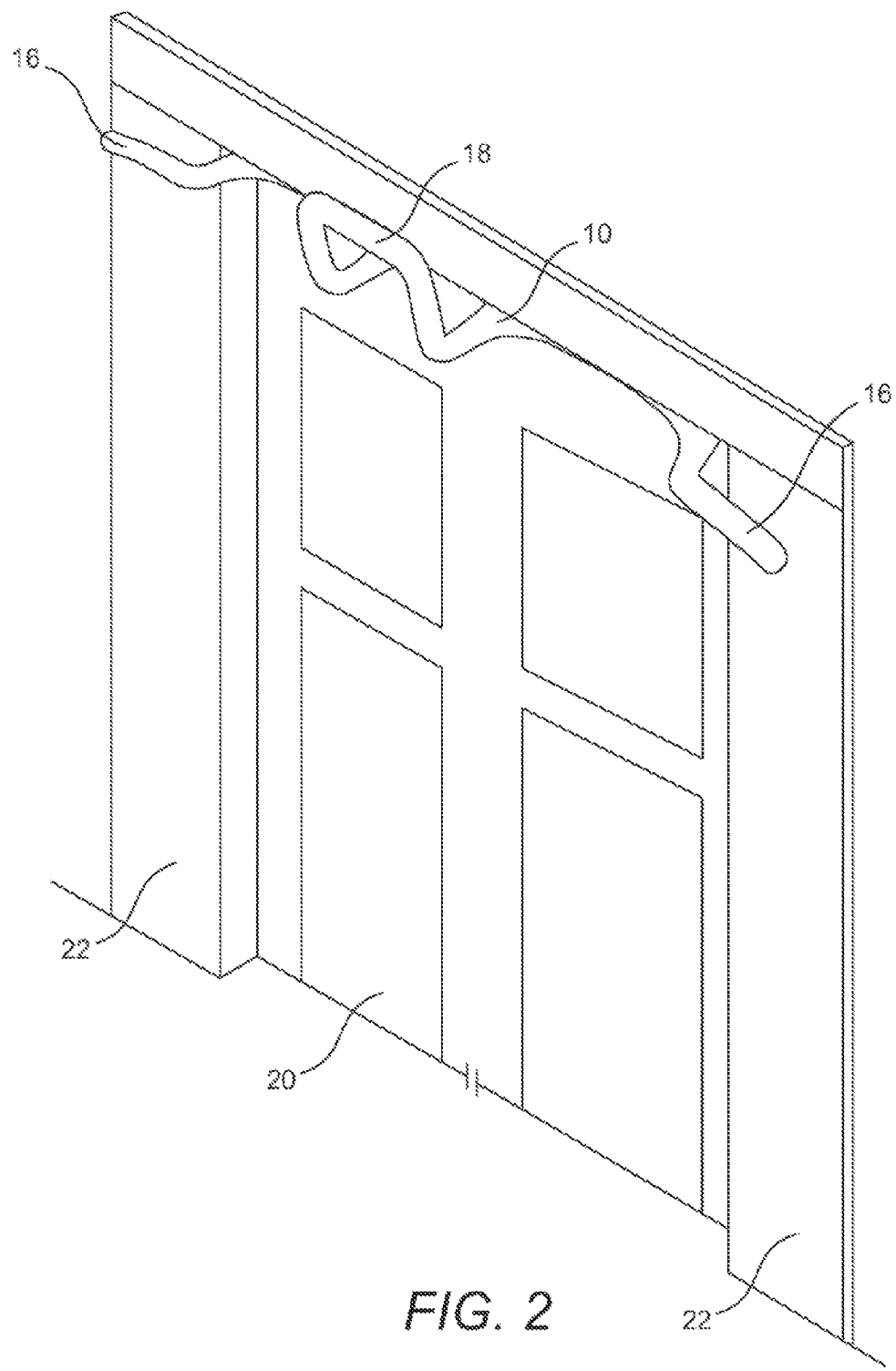
FIG. 2 shows a perspective view of the embodiment of FIG. 1 in place in a doorway with the door closed.

FIG. 2 illustrates a garland hanger 10 similar to the embodiment of FIG. 1 placed within a doorway having a door 20 and adjacent door jambs 22 (only an upper portion of the doorway is shown). As may be seen from FIG. 2, the garland hanger 10 may be placed near the top of the doorway, with the lateral extension members 16 and the central decorative support(s) 18, if any, protruding forward past the jambs 22. As may be appreciated from this view, decorations may be hung around the sides and top of the doorway without impeding the flow of traffic through the doorway.

As discussed above, while the garland hanger 10 functionally supports garlands or other decorations around a doorway, the garland hanger 10 itself may be decorative. Therefore, the garland hanger 10 may be manufactured from decorative rod iron, wrought iron, or other solid or hollow materials having any desired decorative appearance while still providing the functionality discussed herein. As may be appreciated, versions of the garland hanger 10 may be manufactured to support varying loads, and may therefore be manufactured of varying strengths of materials. Versions of the garland hanger 10 designed to support heavier loads of decorations may be manufactured from stronger materials than versions designed only to support lighter loads. Additionally, some versions of the garland hanger 10 may have portions of higher strength (such as the central support member 12 and frictional members 14) and portions of lower strength (such as the lateral extension members 16 and the central decorative support(s) 18). Many decorative garlands or other decorations are relatively light, and therefore do not exert much force on the garland hanger 10. Garland hangers 10 for such decorations can be partially or entirely constructed from light-weight tubular materials, including tubular steel, tubular aluminum, and even tubular plastics. Some such materials, including plastics, may be manufactured to resemble decorative iron.

Figure 3:
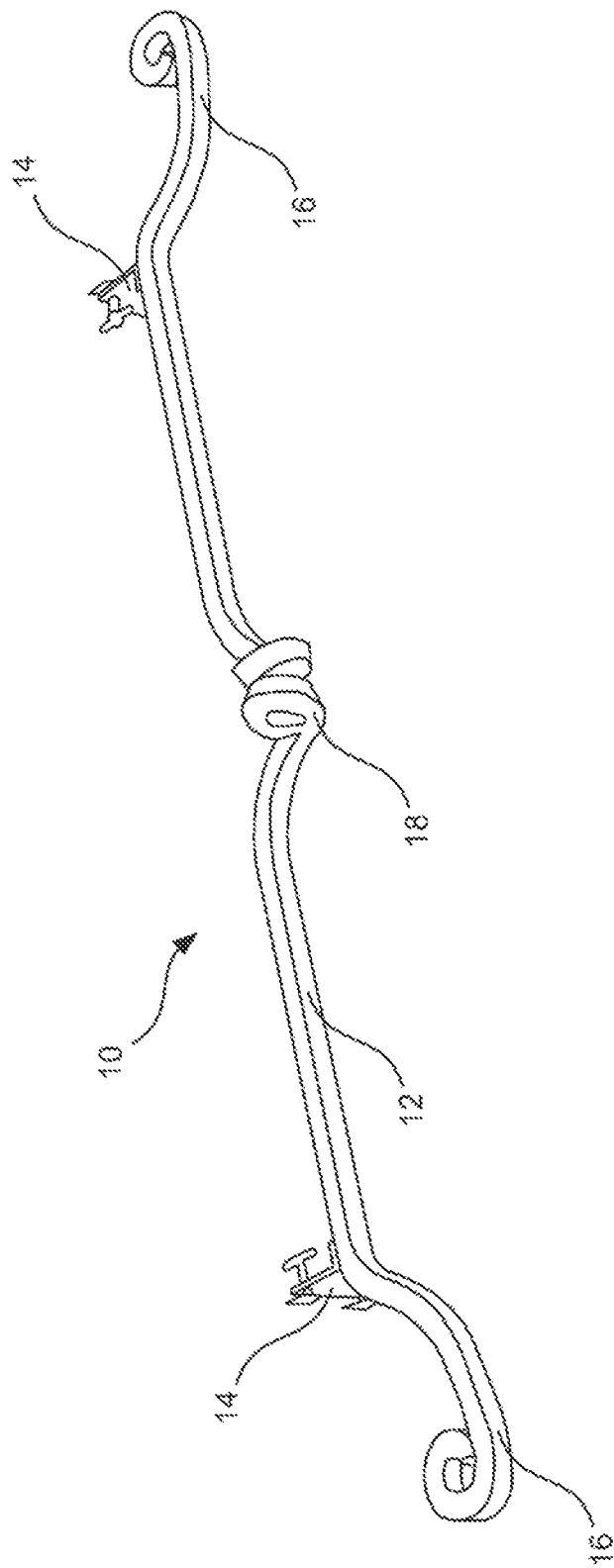
FIG. 3 shows a perspective view of an embodiment of the invention.
Figure 4:
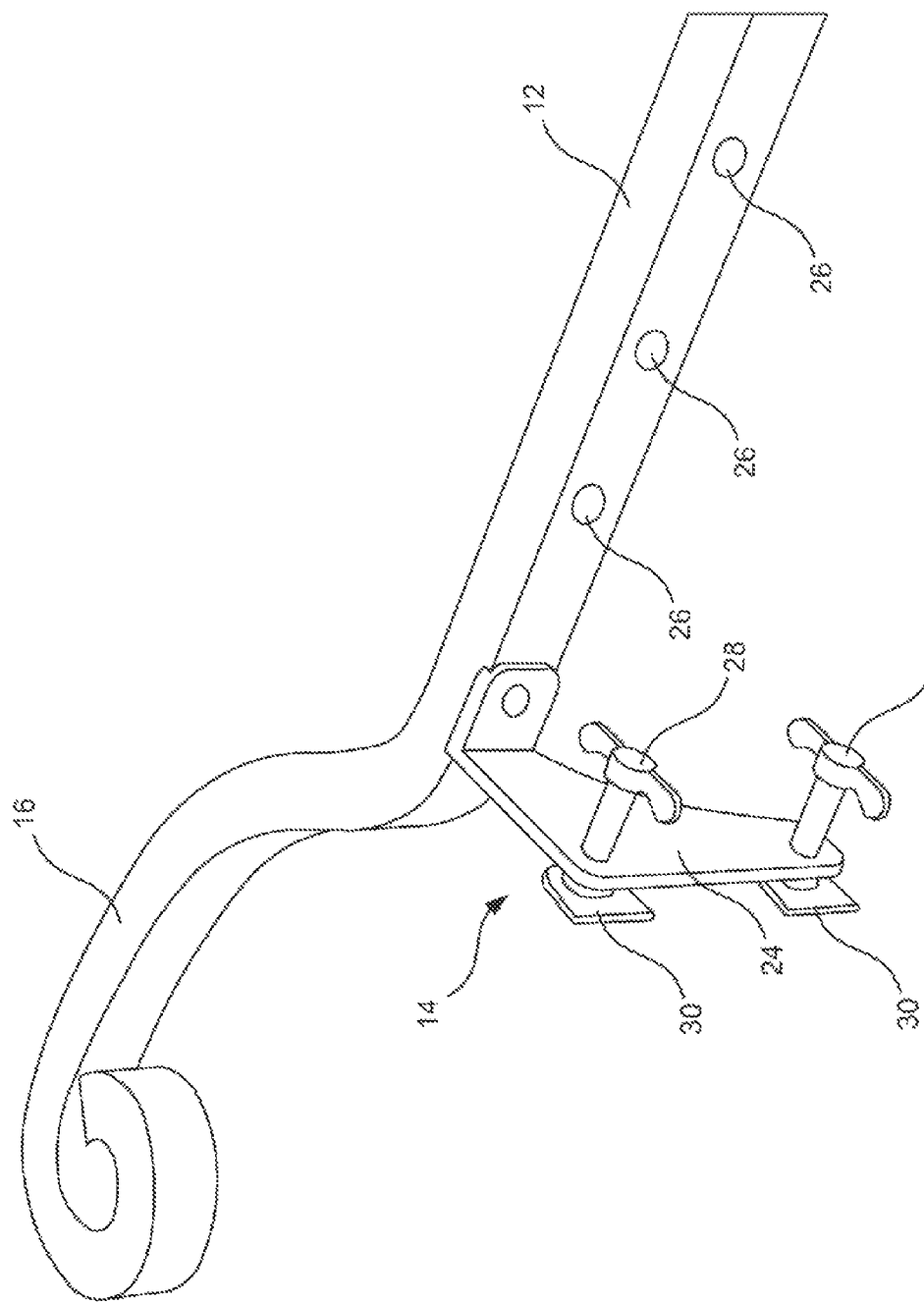
FIG. 4 shows a closer perspective view of the embodiment of FIG. 3 from a different angle.

FIGS. 3 and 4 illustrate embodiment of the garland hanger 10 configured for decorative as well, as functional purposes. This embodiment may be manufactured from several pieces of bar iron bent in the form illustrated or from other materials designed to resemble decorative iron and connected at the midpoint of the garland hanger 10, which corresponds to the central decorative support 18. As may be seen from FIG. 3, this embodiment of the garland hanger 10 is aesthetically pleasing and itself may serve as a decorative element for the doorway.

FIG. 4 provides a close-up perspective view of the outer portion of the garland hanger 10, from the opposite side of the view of FIG. 3. This Figure illustrates additional features of some embodiments of the garland hanger 10. Specifically, the frictional member 14 of this embodiment incorporates several features that enhance certain versions of the garland hanger 10. As may be seen from FIG. 4, the frictional member 14 includes a bracket 24 that is attached to the central support member 12 of the garland hanger 10 at a bracket support hole 26 (such as using a screw, bolt, nesting tabbed extension, etc.). In some embodiments, the bracket 24 is attached to the central support member at two or mom bracket support holes 26 or using some other securing means, including a sliding frictional connection. The plurality of bracket support holes 26 provide substantial adjustability to the garland hanger 10 so that the garland hanger 10 can be adjusted to fit a wide variety of door frame widths. Although not specifically illustrated in FIG. 4, bracket support holes 26 may be provided for each end of the garland hanger 10, and the brackets 24 may be moved independently for maximum adjustability.

The brackets 24 include a pair of thumb screws 28 connected to friction pads 30 that engage the jambs of the doorway. The thumb screws 28 provide further adjustability of the garland hanger 10 and also serve to ensure proper outward force on the friction pads 30 to frictionally secure placement of the garland hanger. Additionally, as this version of the garland hanger 10 is secured at a pair of locations on each side (i.e. the two friction pads 30), the garland hanger 10 is secured against unwanted rotation of the garland hanger out of the desired position in the doorway.

As may be appreciated from FIGS. 3 and 4, the garland- or other decoration-supporting features of the garland hanger 10 may be provided in part by decorative elements of the garland hanger 10. Specifically, the illustrated garland hanger 10 includes curled portions of the decorative bar iron at the ends of the lateral extension members 16 and at the central decorative support 18. These features are not only functional but enhance the decorative features of the garland hanger 10 itself.

Although use of the garland hanger 10 should become largely apparent from the above description, a description of use of the garland hanger 10 is provided below. If the garland hanger 10 is adjustable to fit different size doorways, the garland hanger is first adjusted to an approximate size. If the garland hanger 10 is a type that is compressed to fit in the doorway, the proper size is typically one where the distance between the outer surfaces of the frictional members 14 is slightly larger than the doorway's jamb-to-jamb space. If the garland hanger 10 is a type that includes thumb screws 28 or another sizing mechanism that can be adjusted with the garland hanger 10 in place, the proper size is typically one where the distance between the outer surfaces of the frictional members 14 is slightly smaller than the doorway's jamb-to-jamb space. Once the garland hanger 10 is adjusted to fit the doorway, the garland hanger 10 is placed in the doorway.

To place a compressible-type garland hanger 10, one of the frictional members 14 is placed against one jamb of the doorway, with the adjoining lateral extension member 16 at a height approximating the desired final height. The compressible element(s) of the garland hanger 10 and/or factional member 14 on that side is then compressed by pushing on the garland hanger 10 in the direction of the door jamb already in contact with the garland hanger 10. Meanwhile, the user positions the garland hanger 10 so the other frictional member 14 is adjacent the other door jamb. As the compressible element(s) is/are compressed, the user is able to position the second frictional member 14 at a proper location on the other door jamb, such as by sliding the frictional member 14 into the doorway between the jambs and/or sliding the frictional member upward (or downward) from a position where the garland hanger 10 is at an angle to a position where the garland hanger 10 is substantially horizontal. The final placement may be made by placing force on the garland hanger 10 (and thereby compressing one or more compressible elements) alternatively to one side of the doorway or the other, and moving slightly (or as necessary) the fractional member 14 opposite from the direction of the user-applied force.

To place a post-placement adjustable-type garland hanger 10, the user positions the garland hanger 10 substantially horizontally at the desired height within the doorway (e.g. between the jambs). The user then actuates the thumb screws 28 or other sizing/adjusting elements, possibly one at a time, until enough friction is applied by the friction pads 20 or other portion of the frictional members 14 to hold the garland hanger 10 in place. Before the full frictional force is applied via the adjustment mechanism such as the thumb screws 28, the user can often fine tune the placement of the garland hanger 10. Thereafter, the full frictional force can be applied, such as by fully tightening the thumb screws.

Once the garland hanger 10 is fully and securely in place, the user can decorate around the door by hanging garland or other decorations on the garland hanger 10. The decorations and garland hanger 10 can be removed at the end of a decorative season using a process essentially the reverse of that described above (although unless the garland hanger 10 is to be used for a doorway of a different size, it likely need not be resized prior to storage until needed again).

Figure 5:
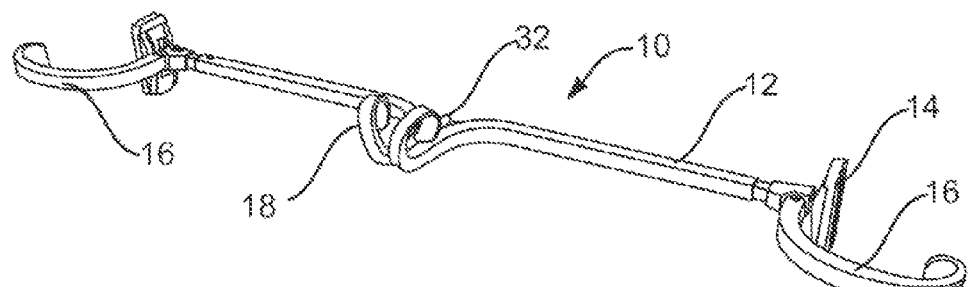
FIG. 5 shows a perspective view of an alternate embodiment of a garland hanger.
Figure 6:
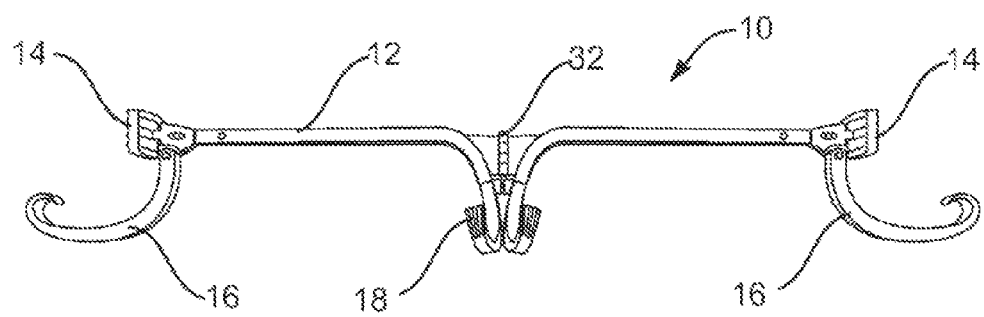
FIG. 6 shows a top view of the embodiment of FIG. 5.
Figure 7:
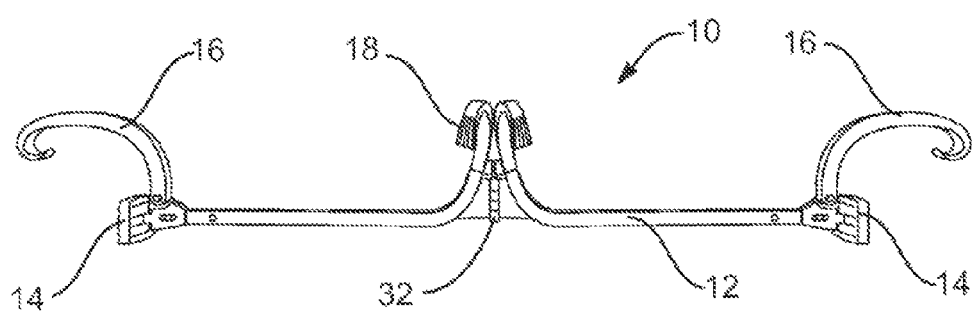
FIG. 7 shows a bottom view of the embodiment of FIG. 5.

FIG. 5 shows a perspective view of an alternate embodiment of the garland hanger 10, while FIGS. 6 and 7 show top and bottom views respectively. This embodiment utilizes many of the features discussed above, with some variations and/or additional features. As can be seen in FIGS. 5-7, the overall configuration/appearance of the embodiment of the garland hanger 10 of these FIGS. 5-7 is similar to the appearance of the embodiment of FIG. 3, and relative placement of the central support member 12, the fractional members 14, the lateral extension members 16, and the central decorative support 18 are similar to the embodiments discussed above. In this embodiment, the frictional members 14 are enlarged in comparison to the previously-discussed embodiments. Additionally, the central decorative support 18 has been divided into two portions. This division of the central decorative support 18 has been made in conjunction with the incorporation of a central hinge 32. The central hinge 32 permits the garland hanger 10 to be folded slightly and/or disassembled at the central decorative support 18 for storage purposes, greatly reducing the total length of the garland hanger 10 for storage.

Figure 8:
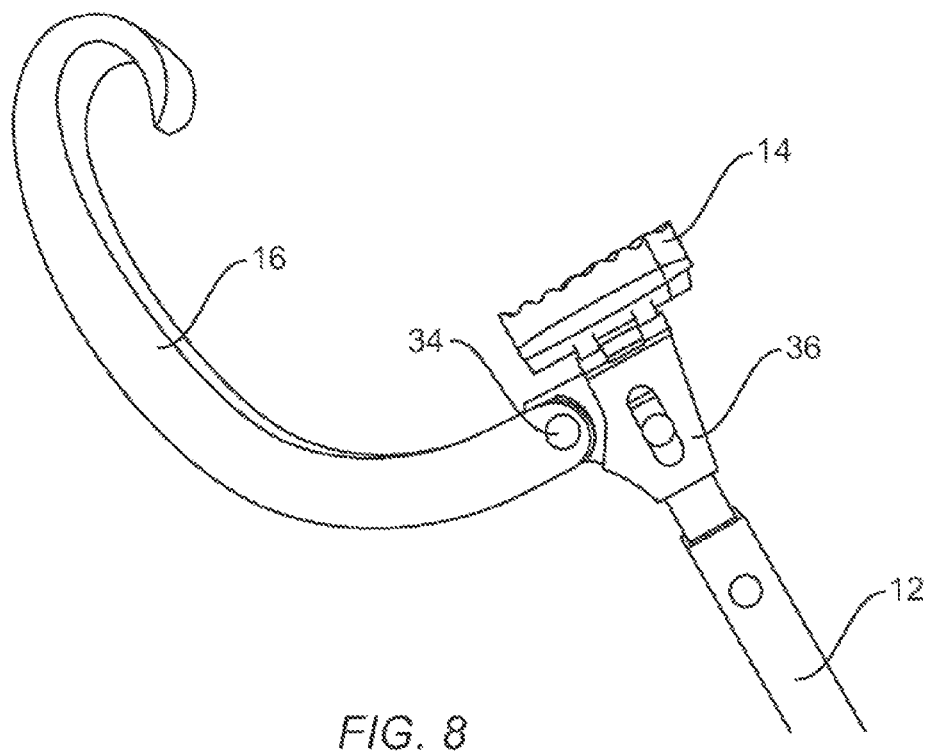
FIG. 8 shows a perspective view of an outer portion of the embodiment of FIG. 5.
Figure 9:
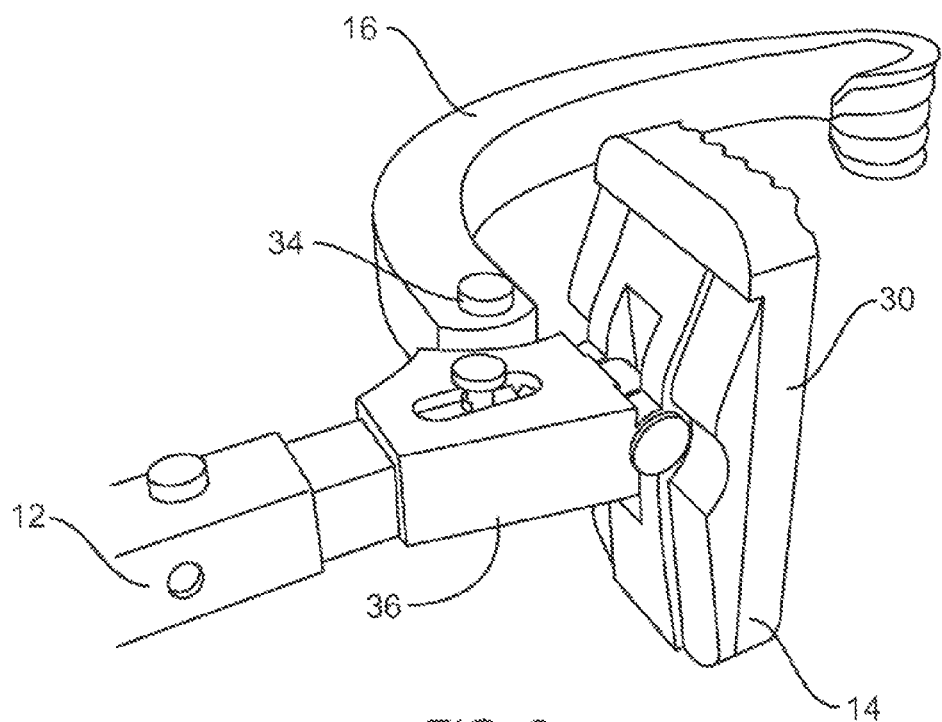
FIG. 9 shows a different perspective view of the outer portion of the embodiment of FIG. 5.
Figure 10:
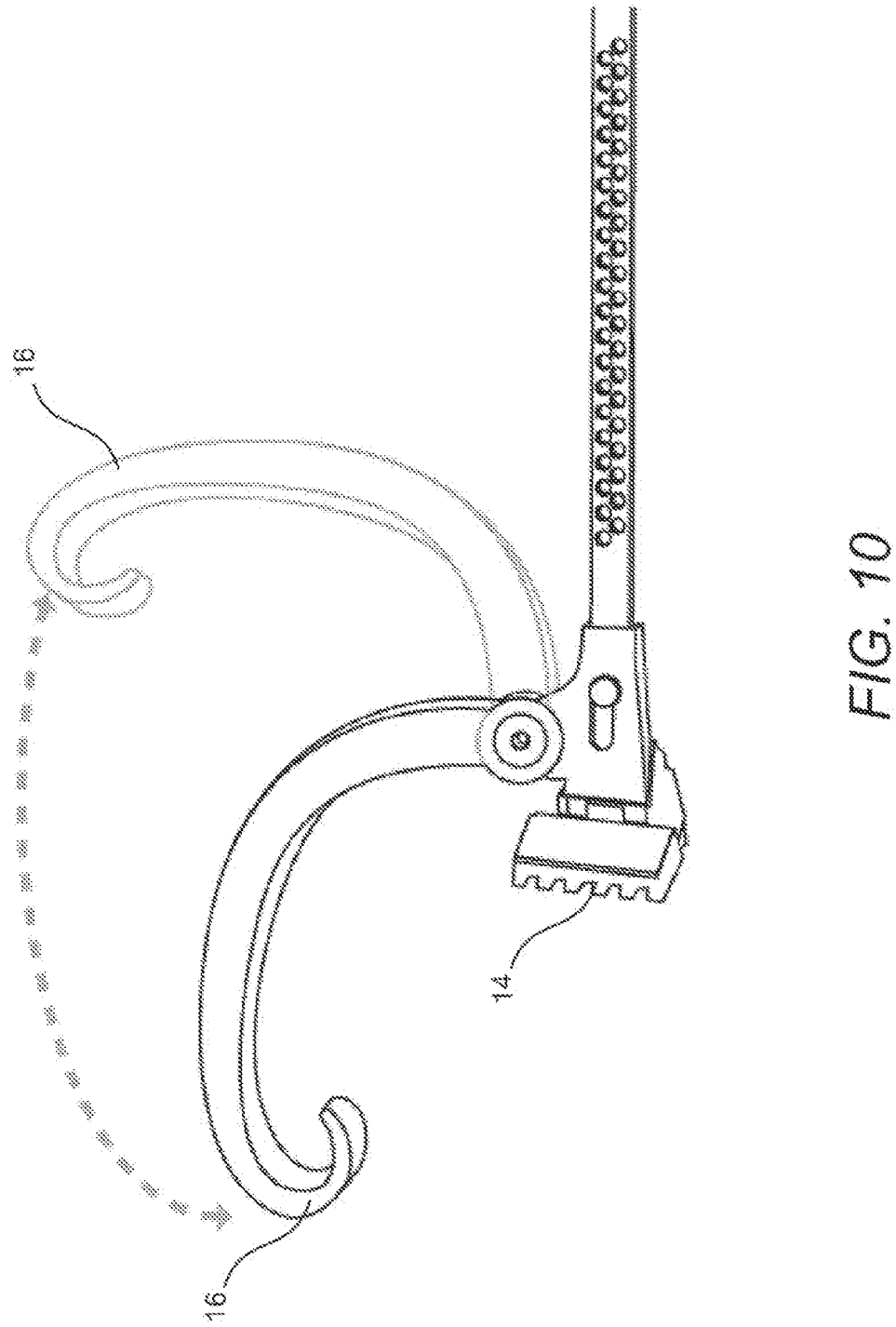
FIG. 10 illustrates adjustments that may be made to a lateral support member according to some embodiments.

FIGS. 8 and 9 show perspective views of an outer portion of the embodiment of the garland hanger 10 shown in FIGS. 5-7, showing features in relation to the frictional member 14 and the lateral extension member 16. In these Figures, it may be seen that the lateral extension member 16 may be removably attached to the remainder of the garland hanger at an attachment point 34. A user-friendly attachment mechanism, such as a screw, bolt, thumb screw, or the like, may be used at the attachment point 34, so that the user can readily remove the lateral extension member 16 for a variety of purposes, including storage of the garland hanger 10, adjustment of the lateral extension member 16, or replacement of the lateral extension member 16 with a version having a different profile or extension length, such as that illustrated in and discussed with respect to FIG. 17. The user may use the attachment point 34 to place or adjust the lateral extension member 16 at or to a different angle if necessary to clear brick, stone or other materials surrounding the doorway, as is illustrated in FIG. 10. This allows the garland hanger 10 to be readily converted and configured for a wide variety of doorway openings, sidelights, and the like, as is discussed below with reference to FIGS. 19 and 21-27.

Figure 11:
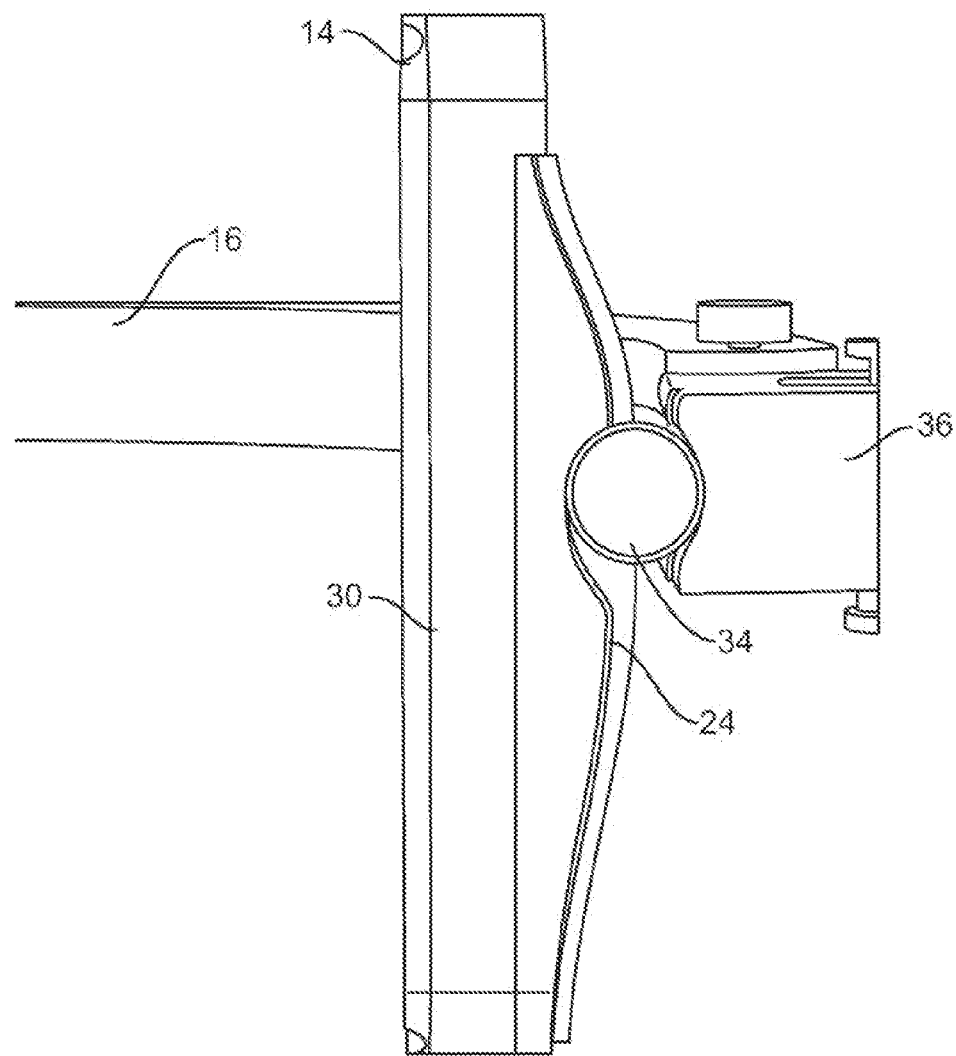
FIG. 11 shows a close-up side view of a bracket and friction pad for use with the embodiment of FIG. 5.

As may also be seen in FIGS. 9 and 11, the friction pad 30 of this embodiment extends above support portions of the friction member 14. While the support portions may be made of metal or some other strong material, the friction pad 30 may be made of a non-damaging/non-marking material that will not damage the door frame. By having the fried on pad 30 extend above the support portions, the friction pad 30 ensures that so upper portion of the door frame is not damaged by use of the garland hanger 10.

FIG. 11 shows a close-up side view of the embodiment of the bracket 24 and friction pad 30 as used with the embodiment of the garland hanger 10 shown in FIG. 5. As discussed above, the friction pad 30 of this embodiment is enlarged in comparison to the embodiments of FIGS. 1-4. The bracket includes a bracket hinge 34 that permits some up-and-down (or side-to-side, depending on the orientation of the bracket hinge 34) movement of the bracket 24 and friction pad 30 as the garland hanger 10 is being positioned in the doorway. Additional ability for some movement (lateral and/or up-and-down) or play of the bracket 24 may be provided by a connecting element 36 that serves to connect dements of the outer portion (such as the bracket 24 and the lateral extension member 16) to the central support member 12. The play or movement of the bracket 24 and the friction pad 30 may make it easier for some users to position the garland hanger 10 in the doorway.

Figure 12:
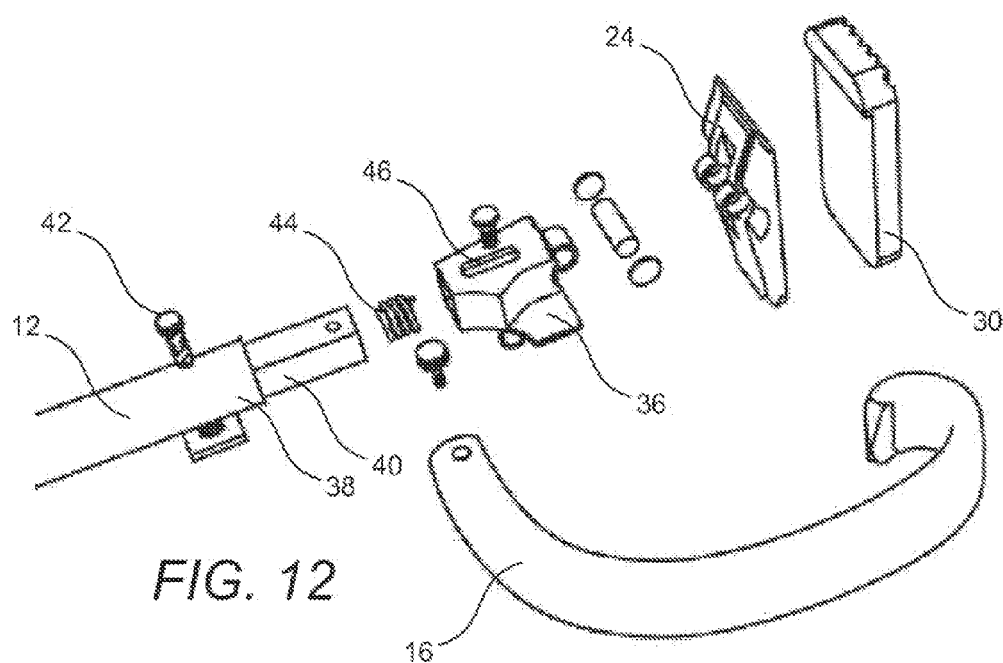
FIG. 12 shows an exploded view of components of the outer portion of the embodiment of FIG. 5.
Figure 20:
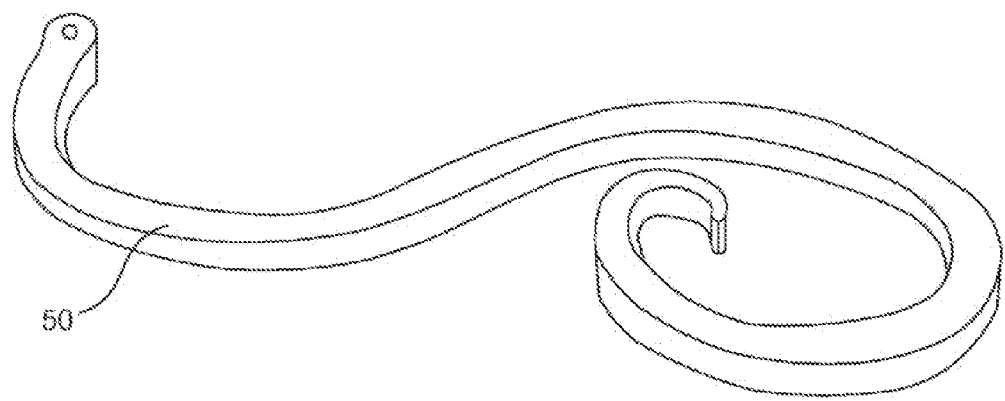
FIG. 20 shows one embodiment of a longer lateral extension member.
Figure 21:
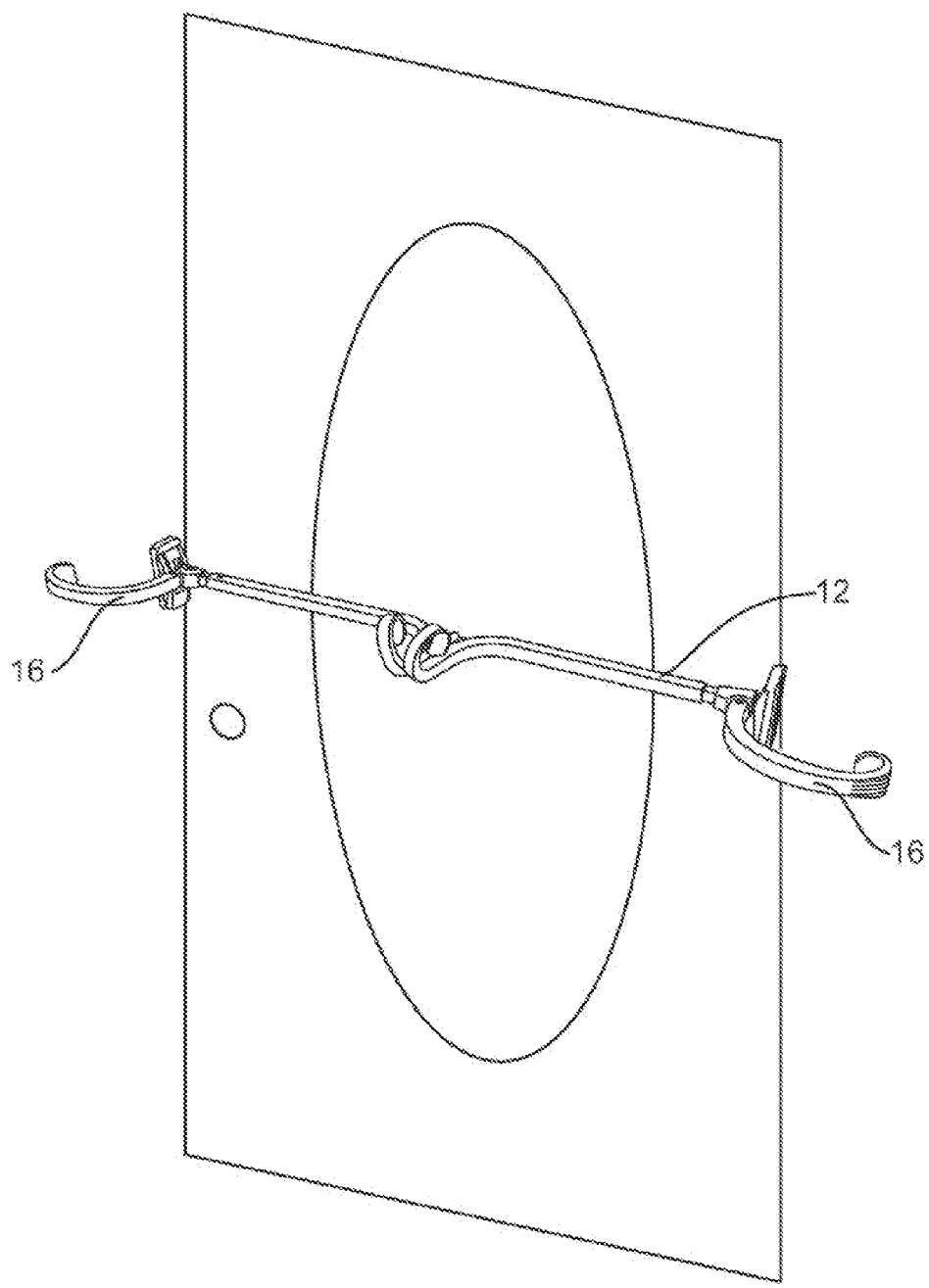
FIGS. 21-27 show the configurations of FIG. 19 in more detail.
Figure 22:
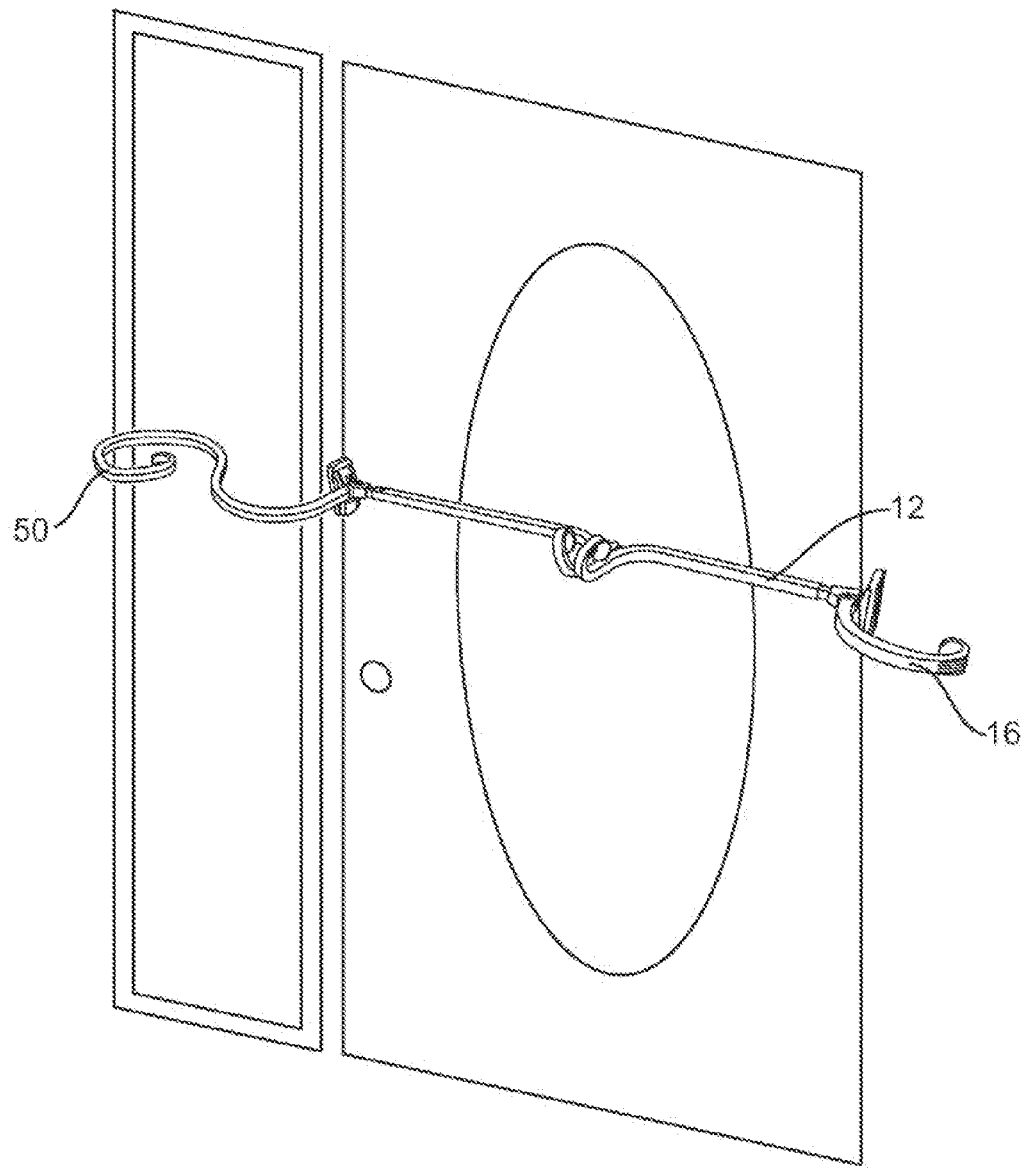

FIG. 12 shows an exploded view of components of the outer portion of the illustrated embodiment of the garland hanger 10. This Figure shows how the outer portion may be constructed to provide flexibility to the garland hanger 10 and to provide interchangeable parts. For example, where a longer lateral extension member 50, such as that shown in FIG. 20, is desired, the lateral extension member 16 depicted in FIG. 11 may be removed and the longer lateral extension member 50 may be used instead. Alternatively, a shorter lateral extension member (not shown) may replace the lateral extension member 16 of FIG. 11. The user may even elect not to use a lateral extension member 16 it desired in tight quarters or for other reasons.

The exploded view of FIG. 12 also shows additional features that, allow resizing of the garland hanger 10 for different-sized doorways. The central support member 12 in this embodiment includes an outer tubular member 38 and a nested inner tubular member 40. Both may be made of decorative materials having similar appearances so as not to draw the eye to the joint between these two members. The inner tubular member 40 may be extended to a desirable length and then secured with a securing means 42, such as a thumb screw, bolt, screw, pin, etc., as shown in FIG. 14. The securing means 42 may engage the inner tubular member 40 using a frictional engagement, but preferably through a physical engagement (e.g. a series of holes in the inner tubular member 40, as shown in more detail in FIGS. 13-14).

Figure 13:
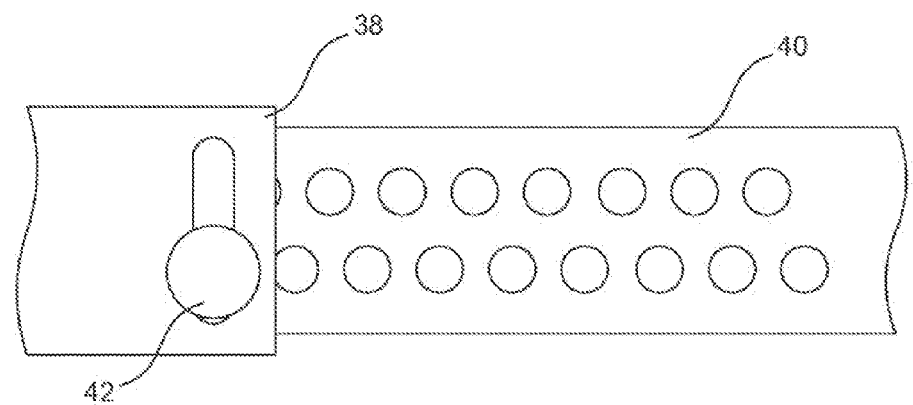
FIG. 13 shows a top view of a portion of an adjustment mechanism of the embodiment of FIG. 5.
Figure 14:
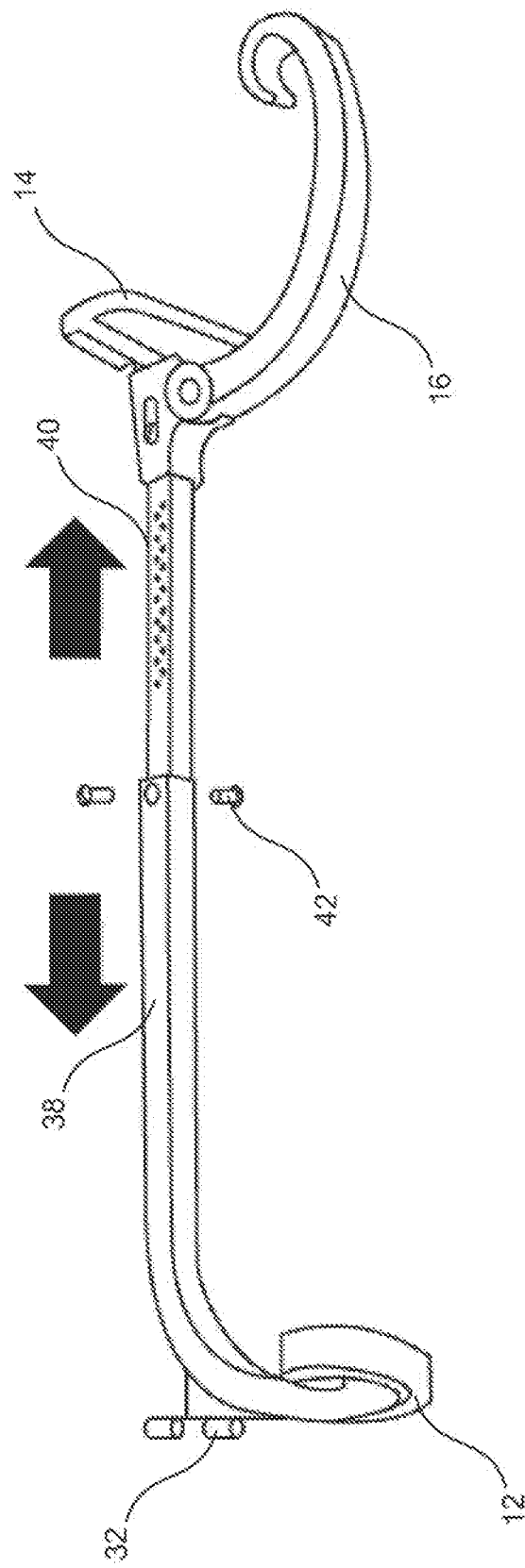
FIG. 14 illustrates adjusting a length of an embodiment of a central support member.

For more flexibility in adjustment sizes of the garland hanger 10, holes may be provided in the inner tubular member 40 in offset rows as shown in the top enlarged view of FIG. 13, allowing finer adjustment of each inner tubular member 40 with respect to each outer tubular member 38, and thus of the length of the garland hanger 10. Thus, a wide range of door sizes may be accommodated by a single garland hanger 10. However and in addition, embodiments of the garland hanger 10 may also be provided in two or more configurations having different available minimum lengths for use in doorway widths of sizes more variable than could be accommodated by a single size of garland hanger 10 alone.

In FIG. 12, a spring 44 is shown that functions with a slot 46 and bolt on the connecting element 36 to provide an outwardly-directed thereon the frictional member 14 (e.g. bracket 24 and friction pad 30) over a selected range of compression of the two frictional members 14. This permits final positioning of the garland hanger 10 and frictional securing of the garland hanger 10 as discussed above.

Figure 15:
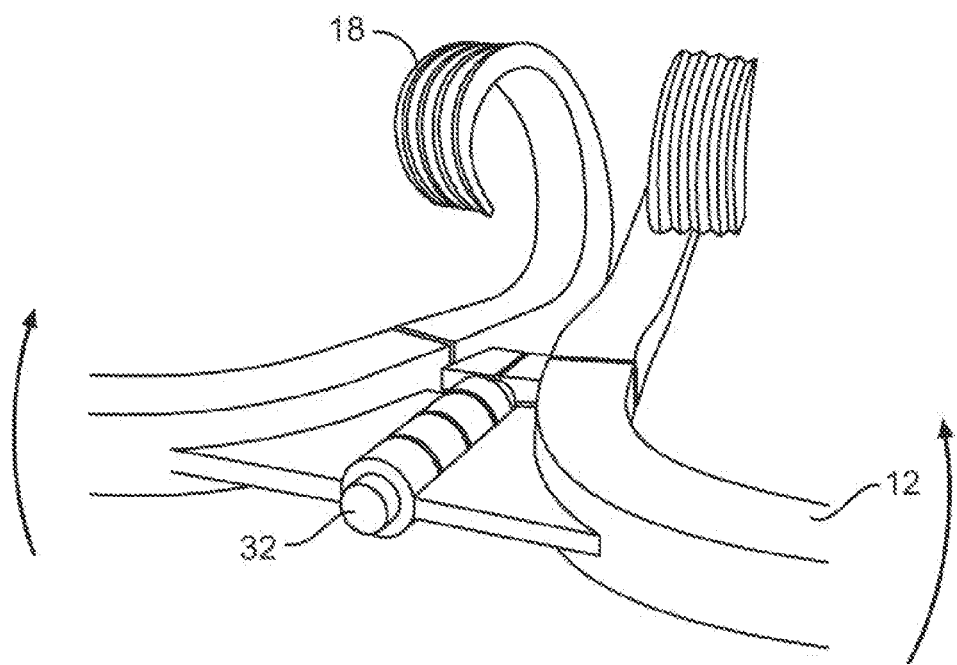
FIG. 15 shows a perspective view of a central portion of the embodiment of FIG. 5.
Figure 16:
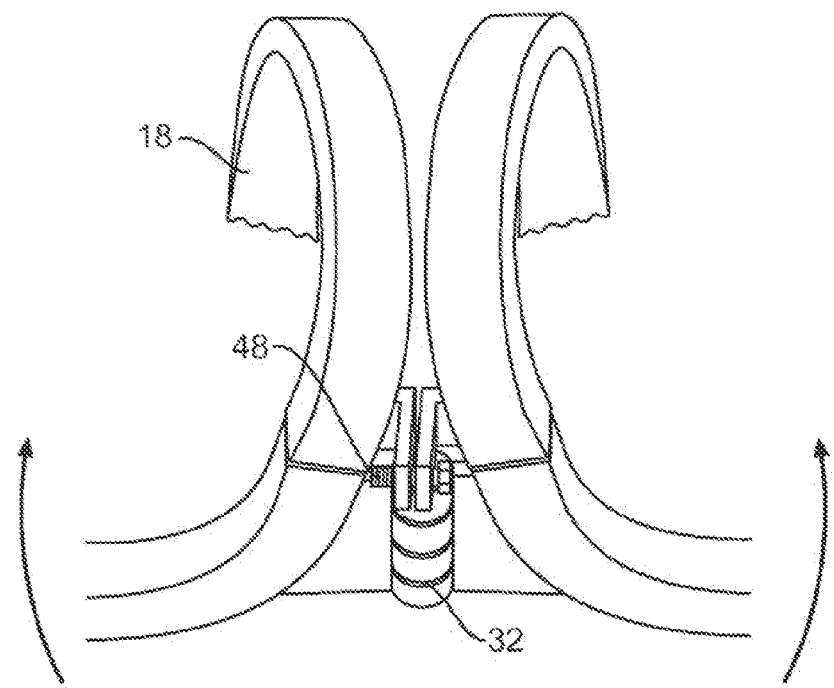
FIG. 16 shows a bottom perspective view of the central portion.
Figure 17:
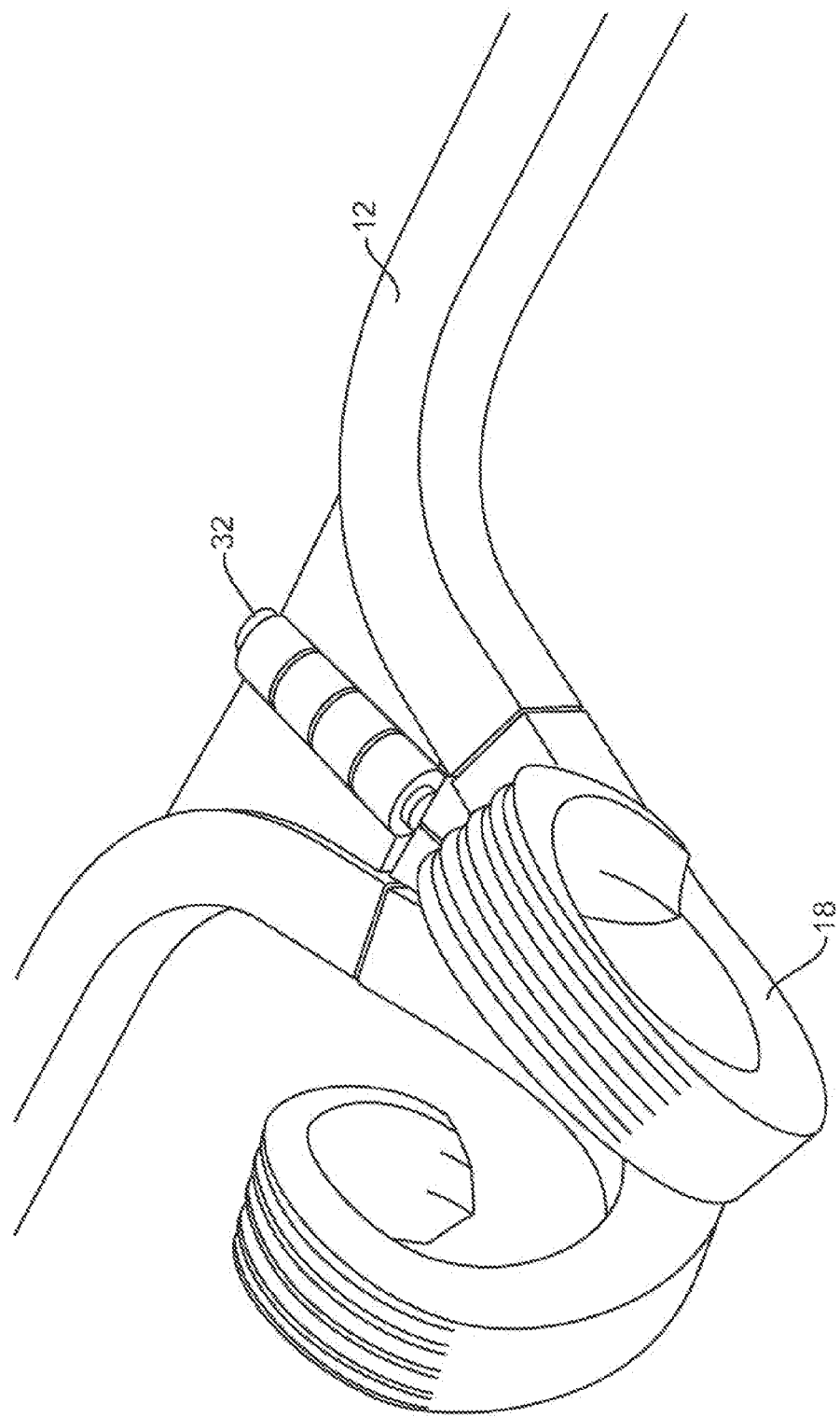
FIG. 17 shows a top perspective view of the central portion.
Figure 18:
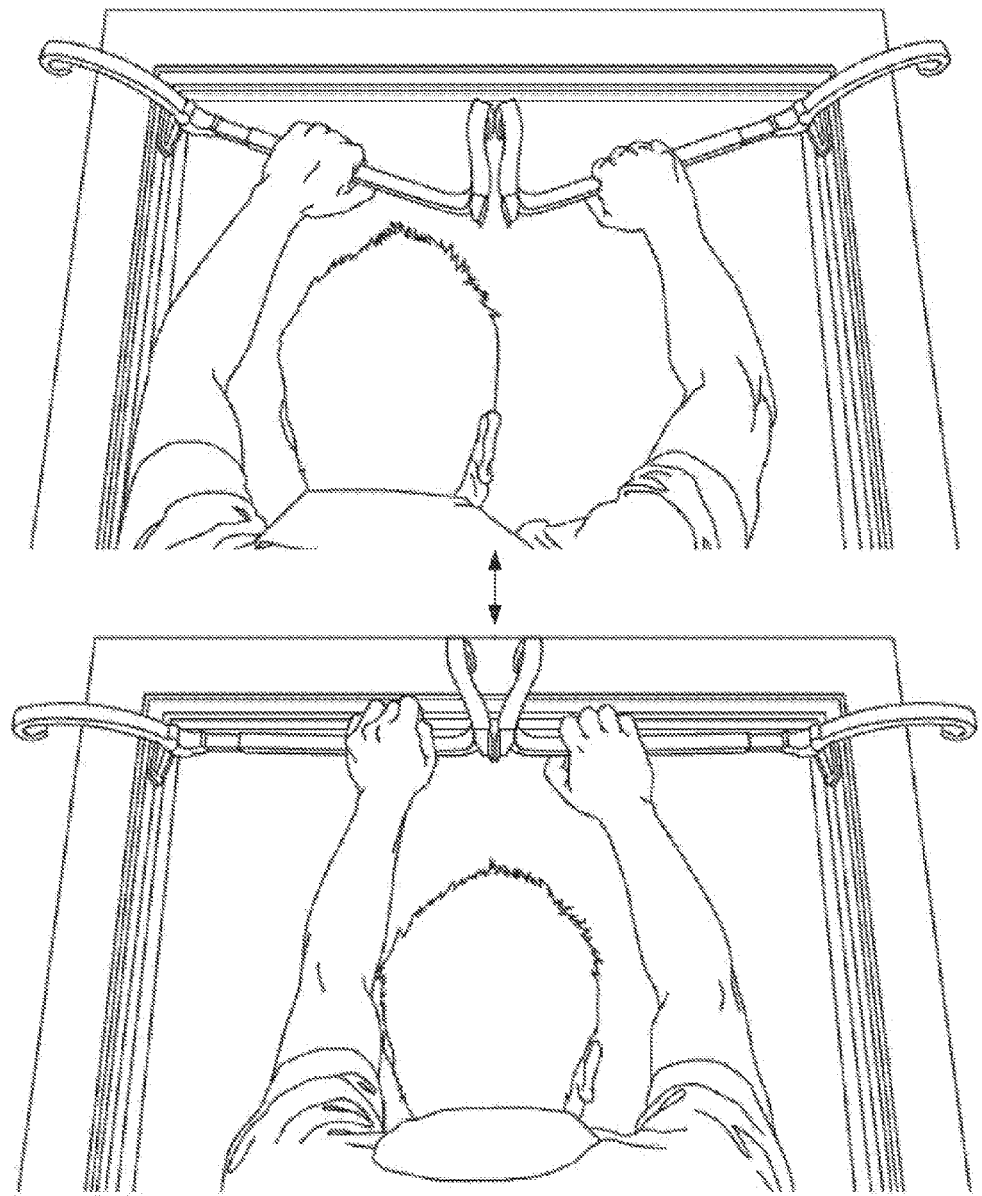
FIG. 18 shows one manner for placing an embodiment of a garland hanger in a doorway.

FIGS. 15-17 show views of a central portion of the garland hanger 10, showing the central hinge 32 in more detail. The central hinge 32 permits folding of the garland hanger 10 somewhat, in approximately the direction of the arrows shown in FIGS. 13 and 14. This folding action facilitates placement of the garland hanger 10 in the doorway as shown in FIG. 18 by sizing the garland hanger 10 slightly larger than the doorway (as discussed above), bending the garland hanger 10 somewhat at the central hinge 32 (thereby reducing the total length), placing the garland hanger in position, as shown in the upper portion of FIG. 18, and then pressing upward near the central hinge to straighten the garland hanger 10, as shown in the lower portion of FIG. 18.

The straightening of the garland hanger 10 engages the frictional members 14 with the door jamb, compresses the springs 44 and frictionally secures the garland hanger 10 in place. The central hinge 32 includes a hinge securing screw 48 (or some other mechanism or mechanisms), as shown in FIG. 16, that serves to lock the central hinge 32 in the open, fully-extended position. This ensures that the garland hanger 10 does not collapse during use. When the garland hanger 10 is to be stored, the hinge securing screw 48 is loosened or removed, allowing the garland hanger 10 to fold at the central hinge 32 for removal from the door, and then the hinge pin of the central hinge 32 may be removed to separate the garland hanger 10 into two pieces approximately half the total length of the garland hanger 10.

Figure 19:
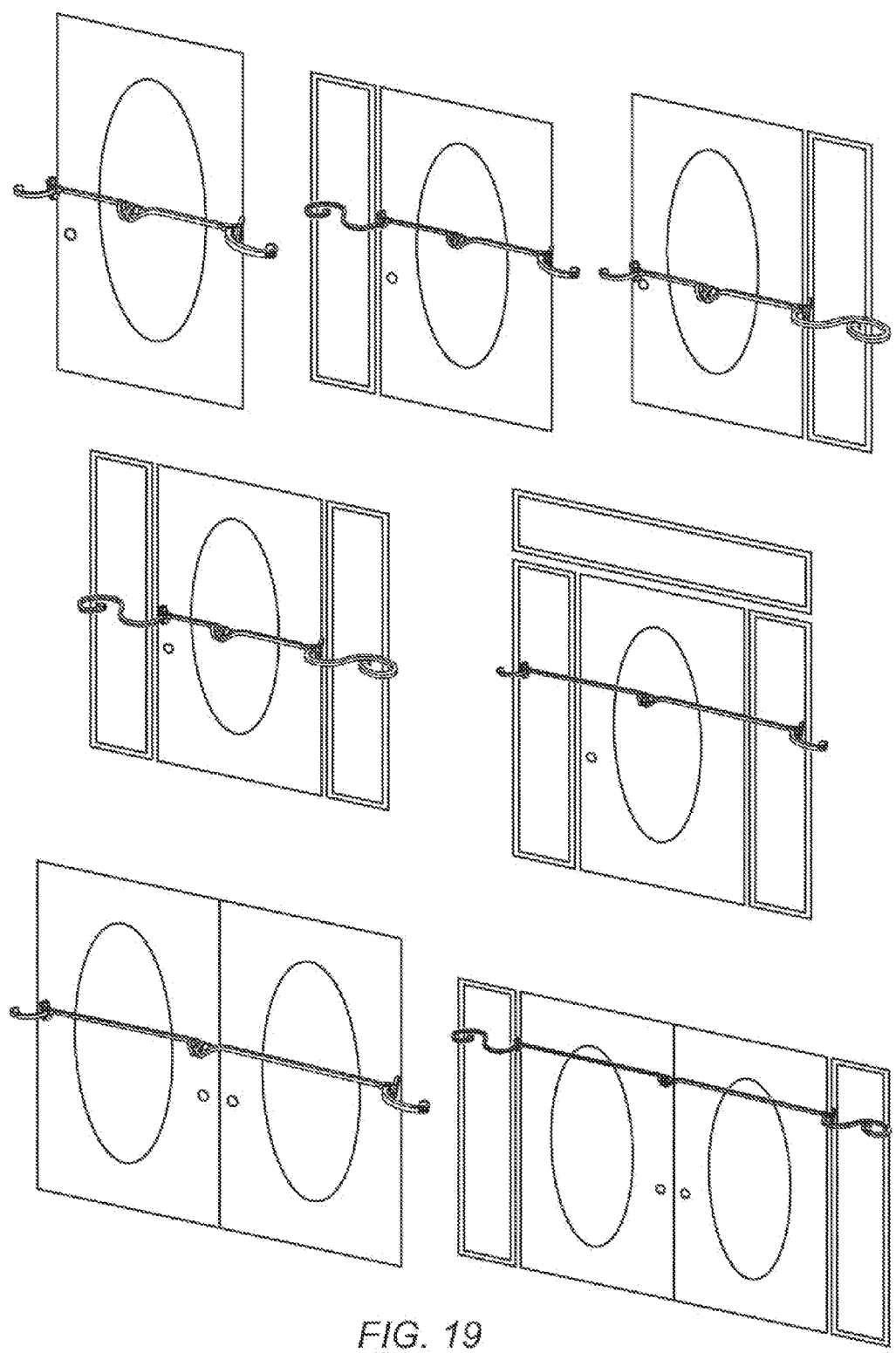
FIG. 19 shows various configurations of embodiments of garland hangers for use with various door configurations.

FIG. 19 shows various configurations of embodiments of the garland hanger 10 for use with various door configurations. These configurations may be assumed by providing garland hangers 10 having different lengths of central support members 12 as discussed previously and/or by modifying the length of the central support members 12 in the manner discussed herein (e.g. by adjusting the connection of the outer tubular members 38 and the inner tubular members 40). In addition, one or both of the lateral extension members 16 may be exchanged for a longer lateral extension member 50 of any decorative design, such as shown in FIG. 20, which permits the hanging of garlands or other decorations at a position more lateral from the point where the frictional member 14 contacts the door frame.

Thus, FIG. 19 shows how different embodiments of the garland hanger 10 may be provided and/or modified for use with varying types of doorways, and FIGS. 21-27 provide a larger view of these illustrated uses. Thus, a configuration of a garland hanger 10 may be used to decorate a single-door doorway (upper left depiction of FIG. 19, also depicted in FIG. 21). In this configuration, the garland hanger 10 has a shorter (compared, with other versions discussed later) central support member 12 that may fit, for example, approximately thirty-two-inch door openings to approximately thirty-eight-inch door openings, or approximately thirty-four-inch door openings to approximately forty-one-inch door openings (although versions may be provided for other ranges of door openings, of course). This configuration includes standard lateral extension members 16, although the user might opt to replace one or both lateral extension member 16 with longer lateral, extension members 50 for functional or decorative purposes.

Figure 23:
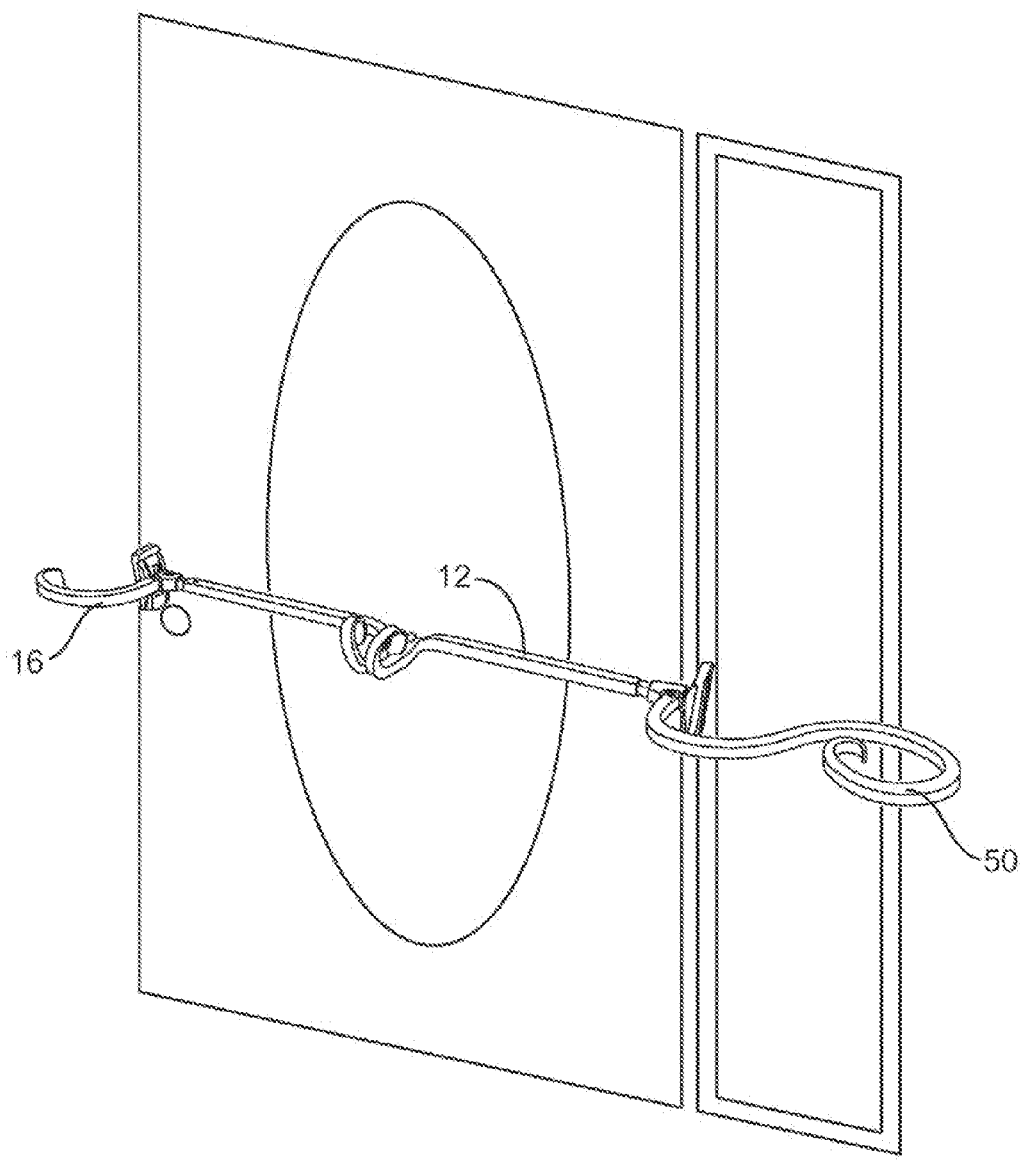

A modified configuration may be used with a doorway having a single door with a left sidelight (upper central depiction of FIG. 19, also depicted in FIG. 22), or a doorway having a single door with a right sidelight (upper right depiction of FIG. 19, also depicted in FIG. 23). In either of these configurations, the central support member 12 is similar to that discussed with respect to the configuration of FIG. 21, but one of the standard lateral extension members 16 (i.e. the one on the side with the sidelight) is replaced with the longer lateral extension member 50, allowing enhanced decoration, options around the sidelight.

Figure 24:
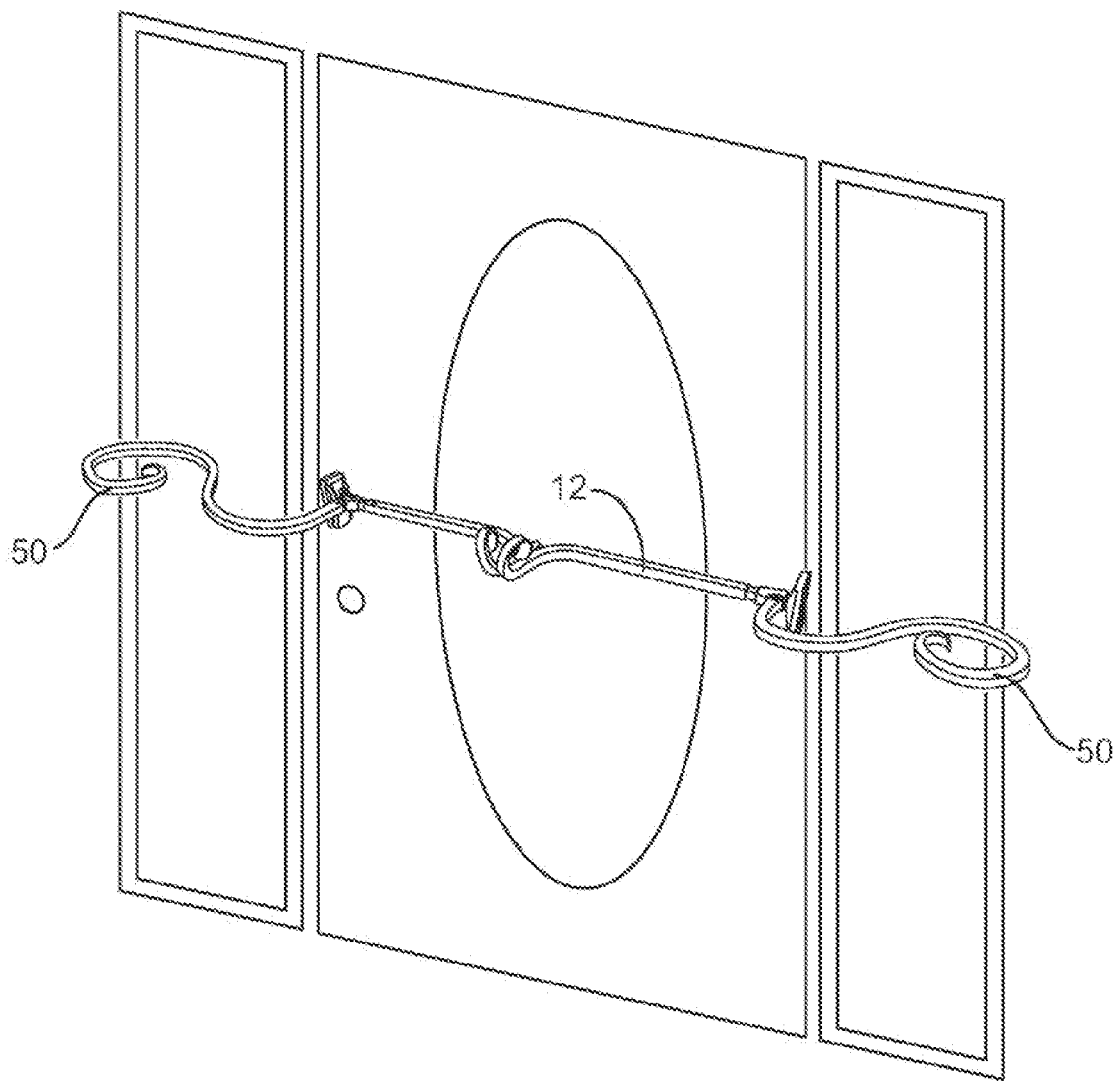
Figure 25:
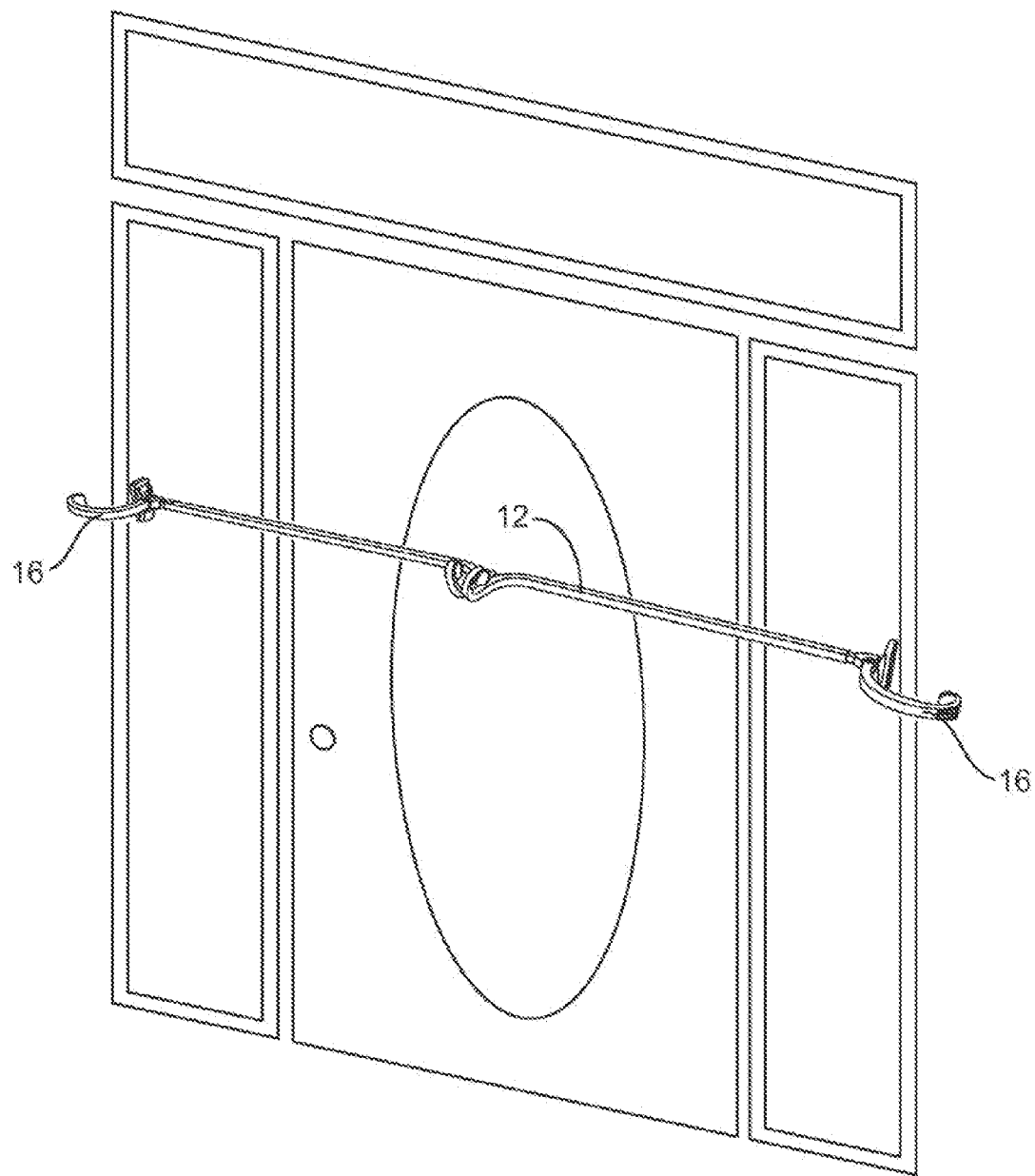

A different configuration may be used with a doorway having a single door with sidelights on both sides (middle left depiction of FIG. 19, also depicted in FIG. 24). In this configuration, both standard lateral extensions 16 are replaced with longer lateral extension members 50 allowing enhanced decoration options on both sides of the doorway and around both sidelights.

If the doorway has a transom and/or a wider outer frame that permits the frictional members 14 to engage frame elements larger than just a single door (middle right depiction of FIG. 19, also depicted in FIG. 25), a different garland hanger 10 having a longer central support member 12 than the previous examples may be used. In this configuration, both standard lateral extension members 16 are used, and the longer central support member 12 positions the standard lateral extension members 16 adjacent the outer portion of the transom. Of course, one or both of the standard lateral extension members 16 may be optionally replaced by the longer lateral extension members 50 if desired.

In embodiments or configurations where the space to be spanned by the garland hanger 10 is larger and the garland hanger 10 has a longer central support member 12, it will be appreciated that it is possible to incorporate a larger range of adjustment for the garland hanger width into at least some embodiments. For example, as the central support member 12 is lengthened, the outer tubular member 38 and inner tubular member 40 can each be lengthened. As these members are lengthened, the total length available for size adjustment features potentially increases, and can be used to incorporate a larger adjustment range. Alternatively, a smaller adjustment range may be maintained to reduce unwanted motion of the garland hanger 10 while in place. In any event, the configuration shown in FIG. 25 may have, for example, an adjustment size range of between approximately forty-eight inches and approximately sixty inches.

Figure 26:
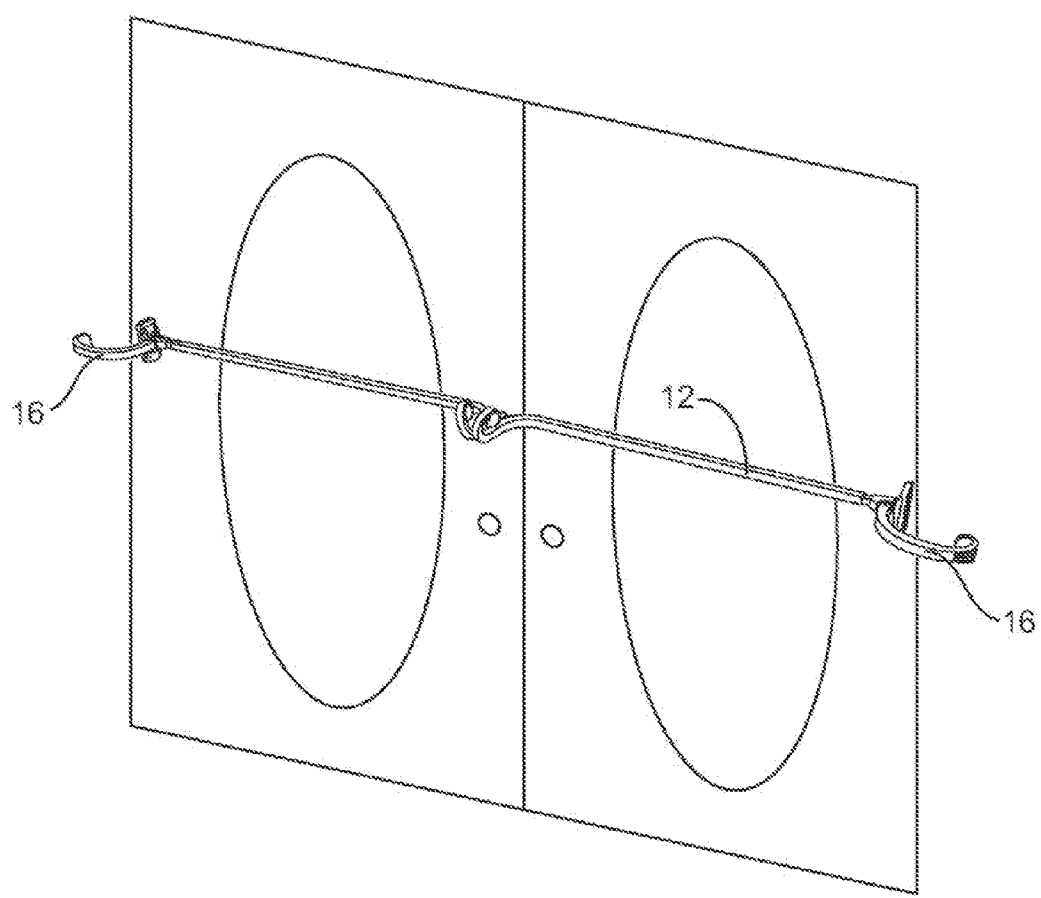
Figure 27:
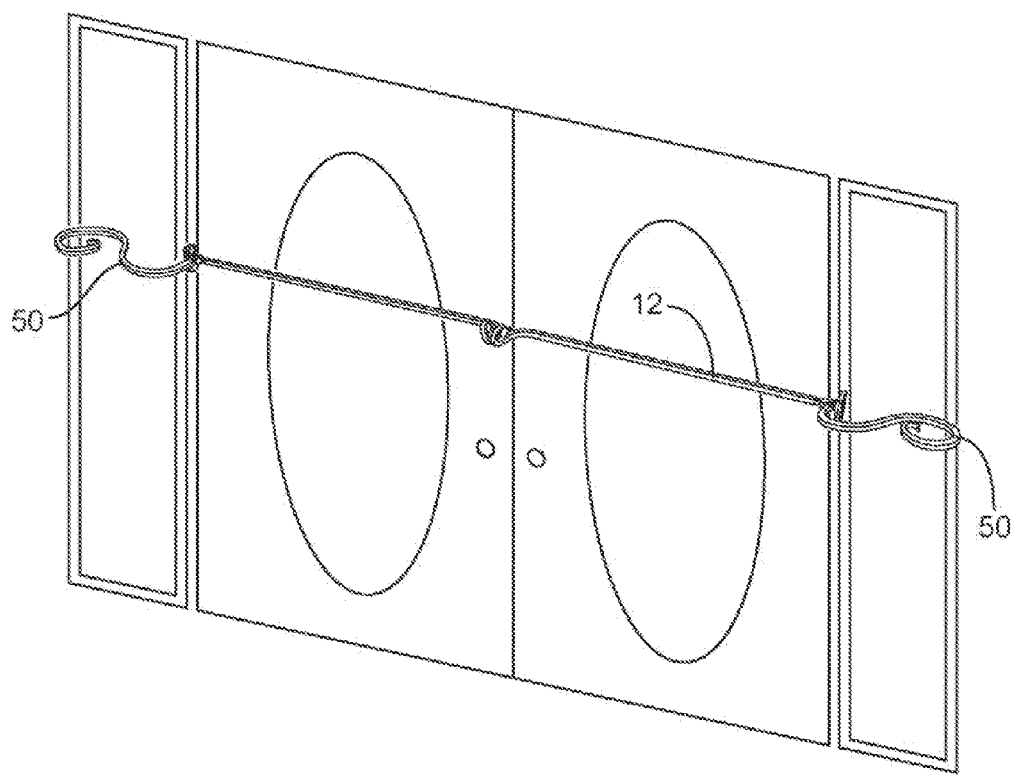

Configurations may of course be provided for even larger doorways, such as a doorway having double doors (such as the bottom left depiction of FIG. 19, also depicted in FIG. 26). This configuration may have an adjustment size range of between approximately sixty-four to approximately seventy-two or approximately seventy-four inches, again using a longer central support member 12. This configuration is largely similar to the configuration for a doorway having double doors with sidelights on both sides (as in the bottom right depiction of FIG. 19, also depicted, in FIG. 27). The difference between the two configurations is the optional replacement of the standard lateral extension members 16 with the longer lateral extension members 50 in conjunction with the presence of sidelights. Of course, those of skill in the art will readily appreciate that other configurations and embodiments of the garland hanger 10 may be used for other doorway configurations not specifically depicted here.

The present invention may be embodied in other specific forms without departing from its spirit or essential characteristics. The described embodiments are to be considered in all respects only as illustrative and not restrictive. The scope of the invention is, therefore, indicated, by the appended claims, rather than by the foregoing description. All changes which come within the meaning and range of equivalency of the claims are to be embraced within their scope.

What is claimed and desired to be secured by Letters Patent is:

1. A decoration hanger operable for hanging decorations around an opening without damaging a surrounding opening frame or a portion of a building around the opening, the decoration hanger comprising:
   an unhinged central support member having opposing ends; a frictional member coupled to each opposing end of the central support member; a length adjustment mechanism operable to vary a length of the decoration hanger by expanding a distance between the frictional members to facilitate fitting the central support member and the frictional members within openings having different sizes, wherein an outwardly-directed force is applied to substantially parallel sides of an opening by the frictional members when the decoration hanger is located in the opening, and whereby a frictional surface of the frictional members holds the decoration hanger in the opening without damaging the substantially parallel sides; and a lateral extension member integrally formed as an extension of the central support member at a corresponding end of the central support member, a proximal portion of the lateral extension member extending generally perpendicular from central support member, wherein a distal end portion of the lateral extension member extends generally perpendicularly from the proximal end portion of the lateral extension member in a direction that is generally parallel to the central member, the lateral extension member being configured to extend out of the opening to support the decorations beyond the substantially parallel sides of the opening.

2. The decoration hanger of claim 1, further comprising a central decorative support coupled to the central support member and configured to centrally support decorations above the opening.

3. The decoration hanger of claim 1, wherein the frictional members comprise a compressible element that can be compressed to fit the decoration hanger in the opening.

4. The decoration hanger of claim 1, wherein the lateral extension further includes a lateral extension member coupled at each corresponding end of the central support member.

5. The decoration hanger of claim 1, wherein the central member comprises a first support member nested within a second support member, and the length adjustment mechanism includes sliding the first support member in and out of the second support member to a plurality of different positions, thus allowing the decoration hanger to be sized to fit different sizes of openings.

6. The decoration hanger of claim 1, wherein the central support member and the lateral extension member include a material selected from the group consisting of: rod iron, wrought iron, tubular aluminum, tubular steel, tubular plastic, and solid plastic.

7. A decoration hanger operable for hanging decorations around an opening without damaging a surrounding opening frame, or a portion of a building around the opening, the decoration hanger comprising:

an unhinged central support member comprising an outer tubular member and a length adjustment mechanism that comprises an inner tubular member nested in the outer tubular member;

a frictional member coupled to the central support member at each opposing end of the central support member, wherein the inner and outer tubular members facilitate fitting the central support member and the frictional members within openings having different sizes by sliding the inner tubular member in and out of the outer tubular member to a plurality of different positions, wherein an outwardly-directed force is applied to substantially parallel sides of an opening by the frictional members when the decoration hanger is located in the opening, whereby a frictional surface of the frictional members holds the decoration hanger in the opening without damaging the substantially parallel sides; and a lateral extension member integrally formed as an extension of the central support member protruding from each opposing end of the central support member, a proximal end of each lateral extension member protruding from an opposite end of the central support member at a generally perpendicular angle, wherein a distal end portion of each lateral extension member extends generally perpendicularly from a corresponding proximal end portion of the lateral extension member in a direction that is generally parallel to the central member and extends out of the opening to support a decoration along a side of the opening.

8. The decoration hanger of claim 7, further comprising a central decorative support member located along the central support member in order to support the decoration above the opening when the decoration hanger is located within the opening.

9. The decoration hanger of claim 7, wherein a portion of the central support member is substantially co-linear with an edge-contacting portion of the frictional members.

10. The decoration hanger of claim 7, wherein the inner tubular member is configured to be secured to the outer tubular member at a plurality of longitudinal locations.

11. A decoration hanger operable for hanging decorations around an opening without damaging or marring the opening, a surrounding opening frame, or a portion of a building around the opening, the decoration hanger comprising:

an unhinged central support member;

a compressible element coupled to the central support member at each opposing end of the central support member, the central support member and the compressible element being configured to fit within an opening having substantially parallel sides, wherein the compressive element permits an outward force to be applied to frictional members movably attached thereto upon application of a compressive force to the compressible element to facilitate holding the decoration hanger in the opening without damaging the substantially parallel sides;

a lateral extension member connected to and protruding from the central support member, wherein a corresponding frictional member is spaced apart from the lateral extension member;

wherein a central axis of the corresponding frictional member is generally co-planar along a horizontal plane with a central axis of the lateral extension member;

wherein the central axis of the frictional members is generally co-linear with the central axis of the central member, the lateral extension member being configured to extend to support a decoration beyond the opening, a central decorative support member located along and extending above the central support member, the central decorative support member being configured to support of decorations above the opening when the decoration hanger is located within the opening.

12. The decoration hanger of claim 11, wherein the central support member comprises an outer tubular member and an inner tubular member nested in the outer tubular member, wherein the decoration hanger can be sized to fit different sizes of openings by sliding the inner tubular member in and out of the outer tubular member to a plurality of different longitudinal positions.

* * * * *